(12) United States Patent
Takemoto

(10) Patent No.: US 10,435,197 B2
(45) Date of Patent: Oct. 8, 2019

(54) PALETTE, BOX, GEAR AND RESIN SHAPED BODY-MANUFACTURING METHOD

(71) Applicant: Naofumi Takemoto, Tokyo (JP)

(72) Inventor: Naofumi Takemoto, Tokyo (JP)

(73) Assignee: Naofumi TAKEMOTO, Tokyo (JP)

( * ) Notice: Subject to any disclaimer, the term of this patent is extended or adjusted under 35 U.S.C. 154(b) by 0 days.

(21) Appl. No.: 15/940,992

(22) Filed: Mar. 30, 2018

(65) Prior Publication Data

US 2018/0222630 A1 Aug. 9, 2018

Related U.S. Application Data

(63) Continuation of application No. PCT/JP2015/084071, filed on Dec. 3, 2015.

(30) Foreign Application Priority Data

Sep. 30, 2015 (JP) .................................. 2015-193765

(51) Int. Cl.
*B65D 19/00* (2006.01)
*B05C 9/04* (2006.01)
(Continued)

(52) U.S. Cl.
CPC ............ *B65D 19/0028* (2013.01); *B05C 9/04* (2013.01); *B05D 1/02* (2013.01); *B05D 3/0218* (2013.01);
(Continued)

(58) Field of Classification Search
CPC ........... B54D 2519/00034; B54D 2519/00044; B54D 2519/00069; B54D 2519/00079;
(Continued)

(56) References Cited

U.S. PATENT DOCUMENTS 4,051,787 A * 10/1977 Nishitani ........... B65D 19/0012
108/55.3
5,687,652 A * 11/1997 Ruma ................ B65D 19/0012
108/57.25
(Continued)

FOREIGN PATENT DOCUMENTS

CN 102199393 A 9/2011
JP H08276934 A 10/1996
(Continued)

OTHER PUBLICATIONS

International Search Report for International Patent Application No. PCT/JP2015/084071, issued by the Japan Patent Office dated Feb. 23, 2016.
(Continued)

*Primary Examiner* — Jose V Chen

(57) ABSTRACT

To provide a palette, etc. on which an article is placed, including: a foamed synthetic resin-base material; and a polyurea-resin coating layer covering a front surface of the base material; and manufactured by a method including: injecting a polyurea-resin coating material onto a front surface of a foamed synthetic resin-base material; and drying the coating material after the injecting. The injecting may have injecting the coating material onto all surfaces of the base material. A thickness of the coating material formed on a front surface of the base material in the injecting may be controlled proportionally to an expansion ratio of the foamed synthetic resin. The thickness of the coating material may be controlled by adjusting a speed of conveyance of the base material and/or a distance between an injection port for the coating material and the base material. Heating-pressing the base material may further be included before the injecting.

20 Claims, 28 Drawing Sheets

(51) Int. Cl.
  *B05D 1/02* (2006.01)
  *B05D 3/02* (2006.01)
  *C08J 9/36* (2006.01)
  *B32B 5/24* (2006.01)
(52) U.S. Cl.
  CPC .......... *B32B 5/245* (2013.01); *B65D 19/0018* (2013.01); *C08J 9/365* (2013.01); *B05D 2201/02* (2013.01); *B05D 2518/00* (2013.01); *B65D 2203/10* (2013.01); *B65D 2519/00034* (2013.01); *B65D 2519/00044* (2013.01); *B65D 2519/00069* (2013.01); *B65D 2519/00079* (2013.01); *B65D 2519/0096* (2013.01); *B65D 2519/00139* (2013.01); *B65D 2519/00268* (2013.01); *B65D 2519/00273* (2013.01); *B65D 2519/00288* (2013.01); *B65D 2519/00293* (2013.01); *B65D 2519/00318* (2013.01); *B65D 2519/00323* (2013.01); *B65D 2519/00338* (2013.01); *B65D 2519/00437* (2013.01); *B65D 2519/00562* (2013.01); *C08J 2323/06* (2013.01); *C08J 2323/12* (2013.01); *C08J 2325/06* (2013.01); *C08J 2375/04* (2013.01); *C08J 2475/02* (2013.01)

(58) Field of Classification Search
  CPC ........... B54D 2519/00268; B65D 2519/00034; B65D 2519/00044; B65D 2519/00069; B65D 2519/00079; B65D 2519/00268
  USPC ......... 108/57.25, 57.26, 57.27, 57.28, 51.11, 108/901, 902
  See application file for complete search history.

(56) References Cited

U.S. PATENT DOCUMENTS

| | | | | |
|---|---|---|---|---|
| 6,418,861 | B1* | 7/2002 | Flam | B65D 19/0059 108/56.1 |
| 6,745,703 | B2* | 6/2004 | Torrey | B65D 19/0012 108/51.11 |
| 8,261,673 | B2* | 9/2012 | Ingham | B65D 19/0095 108/51.11 |
| 8,418,632 | B2* | 4/2013 | Linares | B65D 19/0018 108/51.3 |
| 8,567,324 | B1* | 10/2013 | Paradis | B65D 19/0012 108/51.3 |
| 2001/0029874 | A1* | 10/2001 | Muirhead | B65D 19/0012 108/57.25 |
| 2003/0029412 | A1 | 2/2003 | Kato et al. | |
| 2006/0249058 | A1* | 11/2006 | Moore, Jr. | B65D 19/0026 108/57.25 |
| 2008/0098935 | A1* | 5/2008 | Roth | B65D 19/0073 108/57.17 |
| 2008/0141912 | A1* | 6/2008 | Valentinsson | B65D 19/0014 108/57.33 |
| 2008/0190332 | A1 | 8/2008 | Rimmer et al. | |
| 2009/0114129 | A1* | 5/2009 | Smith | B29C 70/865 108/57.25 |
| 2009/0120823 | A1* | 5/2009 | Seagle | B65D 19/0018 206/386 |
| 2010/0186639 | A1* | 7/2010 | Schiava | B29C 51/16 108/57.27 |
| 2012/0079966 | A1* | 4/2012 | Huang | B32B 7/12 108/57.25 |
| 2012/0111238 | A1* | 5/2012 | Frankenberg | B62B 5/0093 108/57.25 |
| 2012/0160137 | A1* | 6/2012 | Linares | B65D 19/0026 108/57.12 |
| 2013/0014676 | A1* | 1/2013 | Imbrecht | B65D 19/18 108/57.25 |
| 2013/0133557 | A1* | 5/2013 | Yoshinaga | B29C 44/128 108/57.25 |
| 2013/0145971 | A1* | 6/2013 | Federl | B65D 19/0059 108/57.25 |
| 2013/0248674 | A1* | 9/2013 | Johnson | B29C 44/181 248/346.02 |
| 2014/0030457 | A1 | 1/2014 | Kim | |
| 2015/0040803 | A1* | 2/2015 | Burk | B65D 19/0038 108/53.3 |
| 2016/0257444 | A1* | 9/2016 | Wilhelm | B65D 19/0073 |
| 2017/0232722 | A1* | 8/2017 | Waidmann | B32B 38/04 108/57.25 |
| 2018/0370681 | A1* | 12/2018 | Lin | B65D 19/0018 |

FOREIGN PATENT DOCUMENTS

| | | |
|---|---|---|
| JP | H11140381 A | 5/1999 |
| JP | 2003095270 A | 4/2003 |
| JP | 2004042986 A | 2/2004 |
| JP | 2005218732 A | 8/2005 |
| JP | 2006044981 A | 2/2006 |
| JP | 2007204590 A | 8/2007 |
| JP | 2009019312 A | 1/2009 |
| JP | 2014000805 A | 1/2014 |
| JP | 5466318 B1 | 4/2014 |
| JP | 2015051732 A | 3/2015 |
| WO | 2004094251 A1 | 11/2004 |

OTHER PUBLICATIONS

International Preliminary Report on Patentability for International Application No. PCT/JP2015/084071, issued by the International Bureau of WIPO dated Apr. 3, 2018.

Office Action issued for counterpart Chinese Application No. 201580084699.7, issued by China National Intellectual Property Administration dated Apr. 24, 2019.

\* cited by examiner

PALETTE, BOX, GEAR AND RESIN SHAPED BODY-MANUFACTURING METHOD

BACKGROUND

The contents of the following Japanese and PCT patent application(s) are incorporated herein by reference:
NO. JP2015-193765 filed on Sep. 30, 2015, and
NO. PCT/JP2015/084071 filed on Dec. 3, 2015.

1. Technical Field

The present invention relates to a palette, a box, a gear and a resin shaped body-manufacturing method.

2. Related Art

Palettes for placement and conveyance of articles have been used in physical distribution and the like. Conventionally known palettes include wooden, plastic and metallic palettes (please see Patent Document 1, for example). Related technical documents include the following documents.
Patent Document 1: Japanese Patent Application Publication No. H11-140381
Patent Document 2: Japanese Patent No. 5466318

SUMMARY

Palettes and the like preferably are light-weight and have high strength.

A first aspect of the present invention provides a palette on which an article is placed, the palette including: a foamed synthetic resin base material; and a polyurea resin coating layer that covers a front surface of the base material.

A second aspect of the present invention provides a box having an internal space, the box including: a foamed synthetic resin base material to which the internal space is provided; and a polyurea resin coating layer covering a front surface of the base material and an inner wall of the internal space.

A third aspect of the present invention provides a box body having an internal space, the box body including: a foamed synthetic resin base material to which the internal space is provided; a polyurea resin coating layer covering a front surface of the base material at an outer surface of the box body; and a ceramic powder-containing inner wall coating layer covering a front surface of the base material at an inner wall of the internal space.

A fourth aspect of the present invention provides a gear to be attached to a target, the gear including: a foamed synthetic resin base material; and a polyurea resin coating layer covering a front surface of the base material.

In the first to fourth aspects, the coating layer may be formed on all surfaces of the base material.

Assuming that an expansion ratio of the foamed synthetic resin is A, a thickness T1 of the coating layer may satisfy:

$$(A/20)-1 \leq T1 \leq (A/20)+1 \text{ [mm]}.$$

An expansion ratio at a front surface of the base material may be higher than an expansion ratio at a center of the base material.

The base material may have: a plurality of foot portions provided to a surface opposite to a placement surface on which the article is placed; and a positioning portion that is provided to the placement surface and defines positions of the foot portions of another palette if the other palette is placed on the placement surface.

An ID device fixed to the base material may further be included, and the ID device may store identification information identifying the palette.

A fiber sheet provided between the base material and the coating layer may further be included. The polyurea resin may include a polyisocyanate compound and a synthetic resin that are mixed therein.

In the first aspect, the base material may have a plurality of foot portions provided to a surface opposite to a placement surface on which the article is placed, and the fiber sheet may be provided to a region that is on the placement surface and is other than a region facing the foot portions.

A fifth aspect of the present invention provides a manufacturing method of manufacturing a resin shaped body including: injecting a polyurea resin coating material onto a front surface of a foamed synthetic resin base material; and drying the coating material after the injecting.

The injecting may have injecting the coating material onto all surfaces of the base material. A thickness of the coating material formed on a front surface of the base material in the injecting may be controlled in proportion to an expansion ratio of the foamed synthetic resin. The thickness of the coating material may be controlled by adjusting at least one of: a speed of conveyance of the base material; and a distance between an injection portion for the coating material and the base material.

Heating the base material may further be included before the injecting. Pressing the base material may further be included before the injecting.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
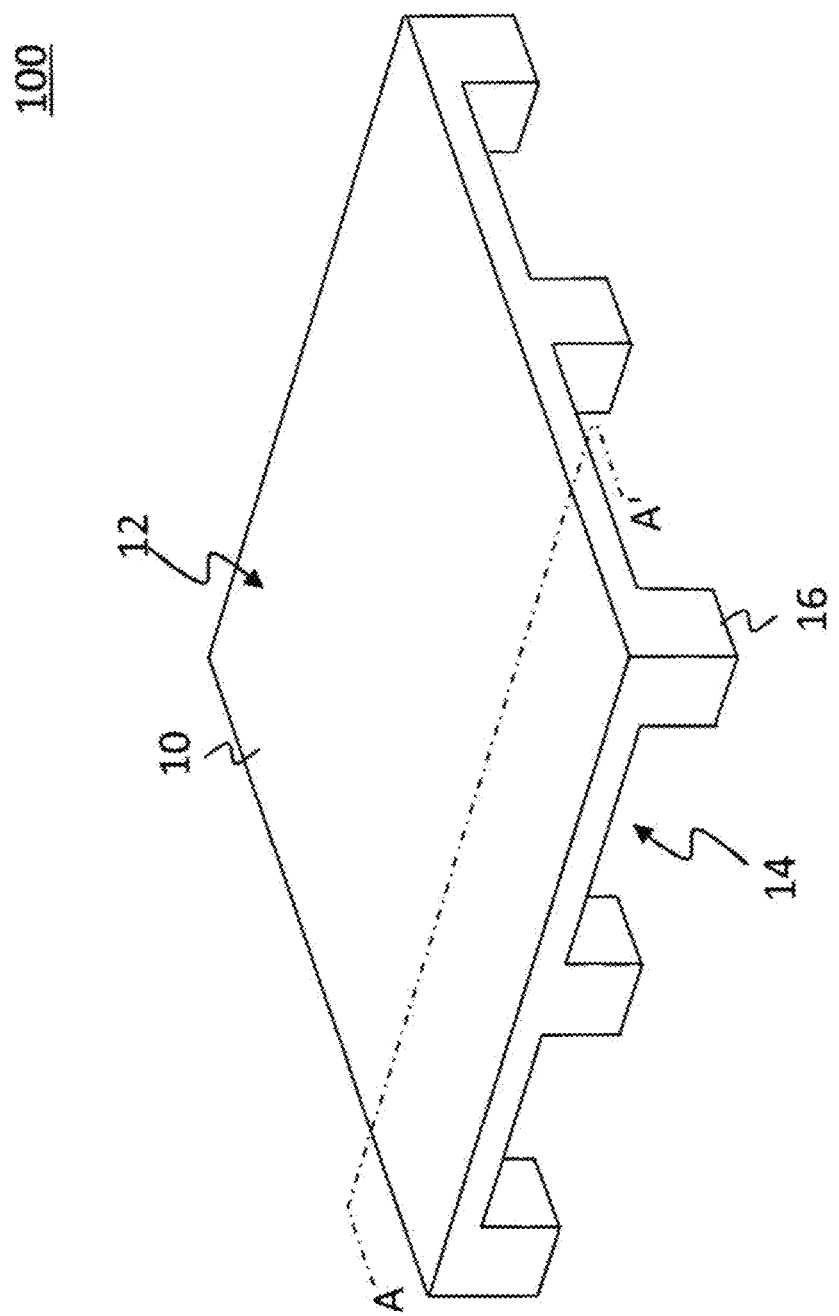
FIG. 1 is a perspective view showing a palette 100 according to a first embodiment of the present invention.

FIG. 1 is a perspective view showing a palette 100 according to a first embodiment of the present invention. Articles are placed on the palette 100. The palette 100 is used for example in physical distribution, and is used for storage and conveyance of articles.

The palette 100 of the present example includes a body portion 10 and a plurality of foot portions 16. The body portion 10 of the present example has a tabular shape. A surface of the body portion 10 on which articles are placed is referred to as a placement surface 12, and a surface opposite to the placement surface 12 is referred to as a rear surface 14.

The rear surface 14 is provided with the plurality of foot portions 16. The plurality of foot portions 16 may be formed integral with the body portion 10, or may be bonded to the body portion 10. The respective foot portions 16 are arranged at predetermined intervals. The foot portions 16 are preferably arrayed in a lattice-like form so that carriers such as fork lifts can pass through between the respective foot portions 16.

Figure 2:
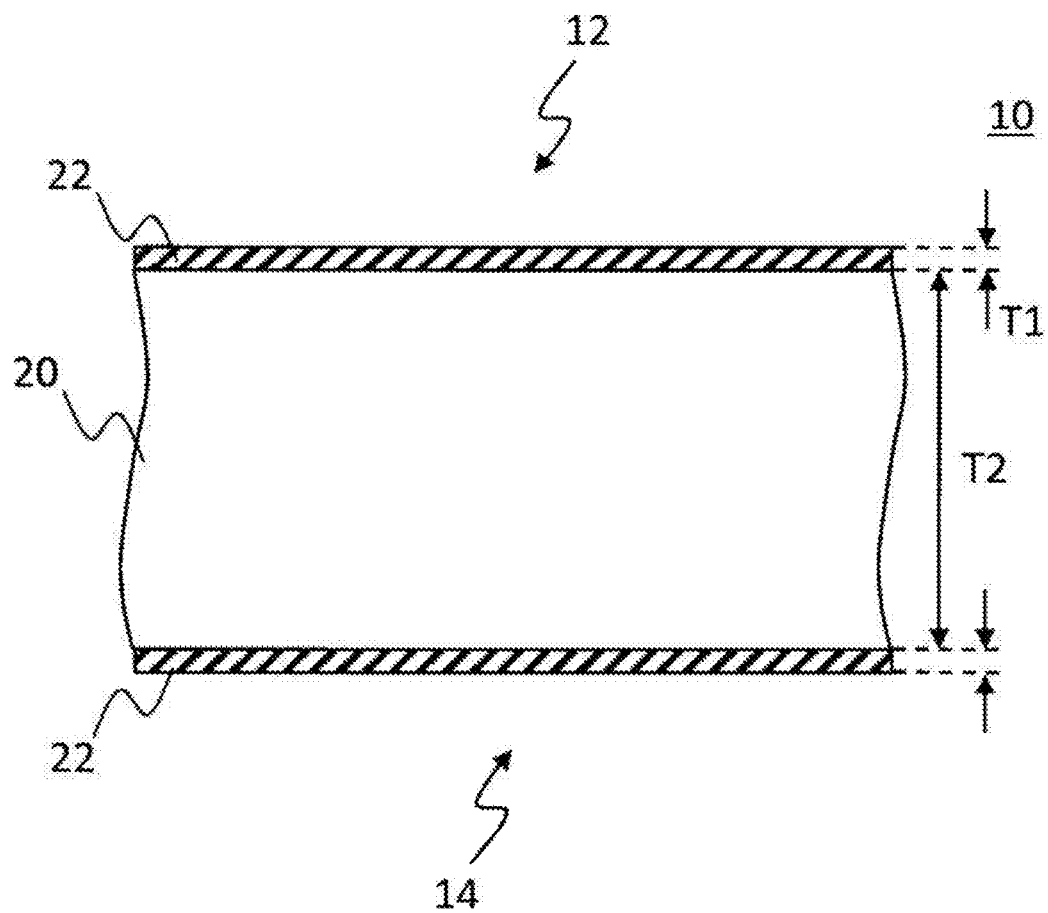
FIG. 2 is a figure showing a partial cross-section of the palette 100.

FIG. 2 is a figure showing a partial cross-section of the palette 100. FIG. 2 shows a cross-section at part of the body portion 10. The palette 100 has a base material 20 and coating layers 22. The base material 20 is formed of a foamed synthetic resin.

As one example, the synthetic resin forming the base material 20 is a highly polymerized compound. As a more specific example, the synthetic resin forming the base material 20 is formed of one or more materials selected from polystyrene, polyethylene, polypropylene and polyurethane. Foamed synthetic resins refer to ones containing micro bubbles dispersed in these synthetic resins. In one example, the base material 20 is formed of a styrene foam (foamed polystyrene).

The coating layers 22 are formed covering the front surfaces of the base material 20. The coating layers 22 are formed of a polyurea resin. Polyurea resins are resins having urea bonds formed by chemical reactions between isocyanate and amino groups, for example. As one example, a polyurea resin is formed by causing a reaction between polyisocyanate and polyamine. A polyurea resin may be formed using a mixed solvent prepared by mixing a polyisocyanate compound with specific gravity of 1.09 to 1.12 and a synthetic resin as a hardener with specific gravity of 1.13 to 1.02, approximately at a volume ratio of 1:1 or a weight ratio of 109:100.

The coating layers 22 are preferably formed over all the surfaces of the base material 20. That is, the coating layers 22 cover all among the placement surface 12, rear surface 14 and side surfaces of the body portion 10. The side surfaces refer to surfaces between the placement surface 12 and the rear surface 14. In addition, the coating layers 22 cover all the front surfaces of the foot portion 16. A coating layer 22 may be or may not be formed on a surface that is among the front surfaces of a foot portion 16 and at which the foot portion 16 is connected with the body portion 10.

A thickness T1 of a coating layer 22 is smaller than a thickness T2 of the base material 20. As one example, the thickness of the base material 20 is equal to or larger than 3 cm, and the thickness T1 of a coating layer 22 is equal to or smaller than 5 mm.

The base material 20 is very light-weight because it is formed of a foamed synthetic resin. In addition, the coating layers 22 have high strength, excel in water resistance and excel in impact resistance because they are formed of a polyurea resin. Because of this, by coating the front surfaces of the base material 20 with the coating layers 22, a palette 100 that is ultra-light-weight and excels in strength, water resistance and impact resistance can be provided.

Because the palette 100 of the present example is very light-weight, it can facilitate carriage, storage and the like to reduce the cost such as energy cost necessary for conveyance of articles or the like. Because of this, it can contribute to environmental measures.

In addition, it excels in workability as compared with wooden, metallic and other palettes, and in addition, can be manufactured at low cost. Furthermore, because it excels in corrosiveness as compared with wooden palettes or the like, running cost can be reduced.

Figure 3:
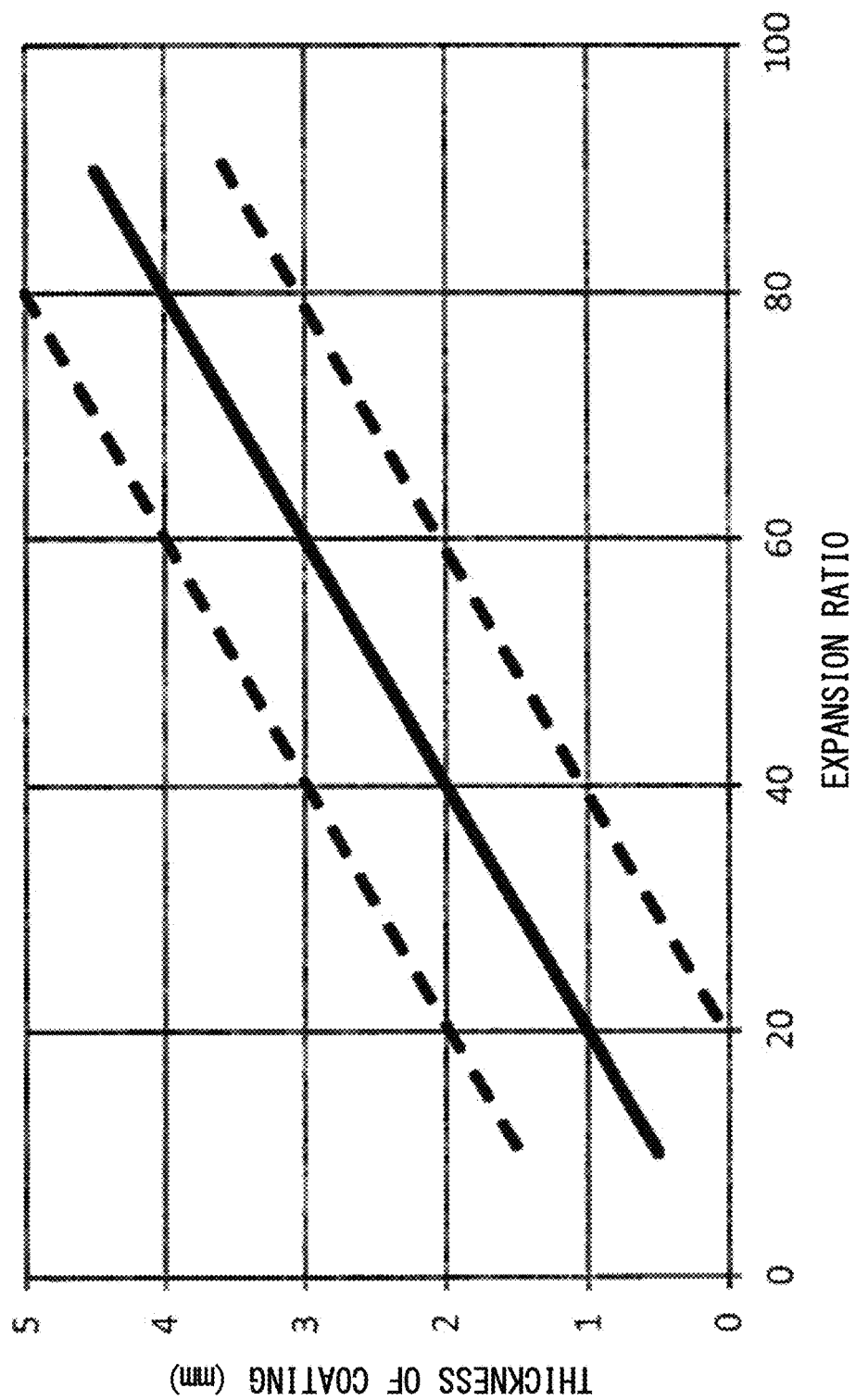
FIG. 3 is a figure showing the relationship between the expansion ratio of a foamed synthetic resin forming a base material 20 and a thickness T1 of a coating layer 22.

FIG. 3 is a figure showing the relationship between the expansion ratio of a foamed synthetic resin forming the base material 20 and the thickness T1 of a coating layer 22. In the present example, the thickness T1 of a coating layer 22 is determined according to the expansion ratio of the base material 20. Expansion ratios indicate percentages of expansion (volume ratios) that is observed if synthetic resin grains (raw material beads) are heated by steam or the like to be expanded, for example. More specifically, in a foamed body with an expansion ratio of 50 times, air occupies 98% of the entire product (volume) and the synthetic resin occupies 2% of it. Generally, the expansion ratio and the strength of the foamed synthetic resin are inversely proportional to each other. For example, if the expansion ratio of a foamed synthetic resin is 30 times, its strength is twice the strength of a foamed synthetic resin with expansion ratio of 60 times, but its volume is approximately half of the volume of the latter foamed synthetic resin.

The expansion ratio is selected according to uses of the base material 20. According to uses, the thickness and strength that the base material 20 should have are determined. The expansion ratio is determined according to the strength of the base material 20.

The thickness T1 of a coating layer 22 is set to be generally proportional to the expansion ratio. Normally, the thickness T1 of a coating layer 22 is approximately A/20 [mm], assuming that the expansion ratio is A. For example, in normal palette uses, if the expansion ratio is 40 times, the thickness T1 of a coating layer 22 is preferably 2 mm approximately. In addition, if the expansion ratio is 60 times, the thickness T1 of a coating layer 22 is preferably 3 mm approximately. By making the thickness T1 of a coating layer 22 proportional to the expansion ratio A, the thickness T1 of the coating layer 22 is increased as the strength of the base material 20 decreases so that the strength of the entire palette 100 can be maintained.

Note that the thickness T1 of a coating layer 22 may be increased or decreased relative to a normal thickness. As one example, if it is desired to provide a higher strength, the thickness T1 of a coating layer 22 is increased, and if it is desired to lower the cost, the thickness T1 of the coating layer 22 is made smaller. As one example, the thickness T1 of a coating layer 22 may be in the range shown below, which corresponds to the range indicated with dotted lines in FIG. 3.

$$(A/20)-1 \leq T1 \leq (A/20)+1 \text{ [mm]}$$

The expansion ratio of a foamed synthetic resin can be estimated from the material type of the synthetic resin and the weight per unit volume of the foamed synthetic resin. That is, the volume of a foamed synthetic resin before foaming is estimated from the weight per unit volume of the synthetic resin and the material of the synthetic resin. Then, the expansion ratio is calculated from the estimated volume of the synthetic resin before foaming and the unit volume of the foamed synthetic resin.

Figure 4:
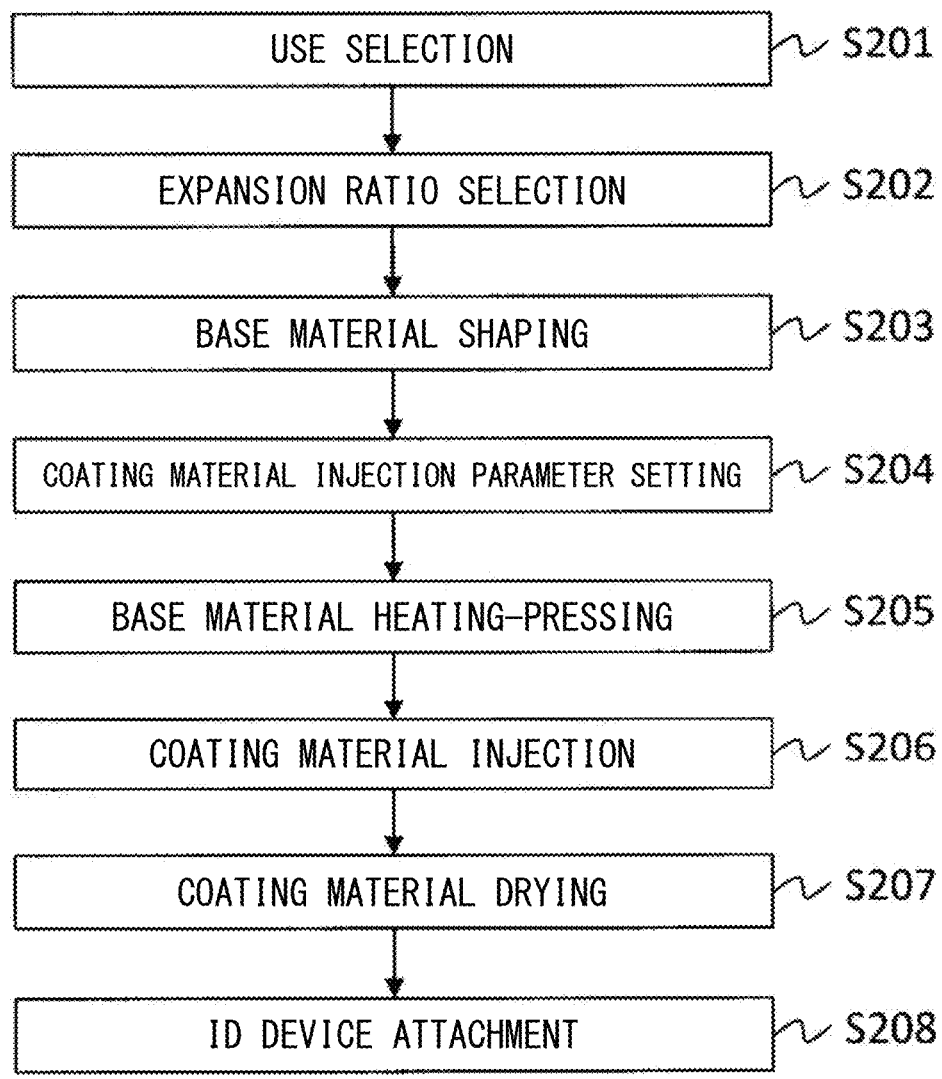
FIG. 4 is a flowchart showing one example of a process of manufacturing a resin shaped body.

FIG. 4 is a flowchart showing one example of a process of manufacturing a resin shaped body. First, at a use selection step S201, the use of a resin shaped body is selected. Other than the palette 100, examples of uses of resin shaped bodies may include protectors and box bodies mentioned below, but these are not the sole examples. In the present example, the use of a resin shaped body is the palette 100.

Next, at an expansion ratio selection step S202, the expansion ratio of a foamed synthetic resin used for a resin shaped body is selected. The expansion ratio may be determined according to the use selected at S201. As one example, the thickness of a resin shaped body in a case that a protector is to be manufactured is smaller than the thickness of a resin shaped body in a case that the palette 100 is to be manufactured, in some cases. For example, the thickness of the protector is assumed to be approximately ⅓ of the thickness of the palette 100. In this case, the expansion ratio in a case that the protector is to be manufactured may be set to approximately ⅓ of the expansion ratio in a case that the palette 100 is to be manufactured.

Next, at a base material shaping step S203, a foamed synthetic resin base material is shaped into a predetermined shape. For example, the foamed synthetic resin base material 20 is shaped into the shape of the palette 100. At S203, the base material 20 shaped into a rectangular parallelepiped may be cut into a predetermined shape. In addition, at S203, a plurality of parts may be shaped. For example, the body portion 10 and the foot portions 16 of the palette 100 may be shaped separately.

Next, at a parameter setting step S204, each parameter used when injecting a coating material is set. The parameters include, for example, the injection amount of the coating material per unit time for a unit area of the base material 20, and the like. The injection amount per unit area of the base material 20 can be adjusted by means of the speed of conveyance of the base material 20 or the like, as mentioned below.

In addition, at a heating-pressing step S205, the base material 20 is heated and pressed. By heating the base material 20, moisture content contained in the base material 20 is removed. Thereby, unevenness of the coating layers 22 to be formed on the front surfaces of the base material 20 can be reduced. If a lot of moisture content is contained in the base material 20, the body portion 10 of the palette 100 warps, forming an upward protrusion, for example. In addition, by pressing the base material 20, bubbles at the front surfaces of the base material 20 are crushed, and the resin density at the front surfaces of the base material 20 becomes higher than the resin density at the center of the base material 20. Thereby, it is possible to prevent the coating material from being diffused into the base material 20 when the coating material is injected onto the front surfaces of the base material 20. Whichever one of S204 and S205 may be performed first or they may be performed simultaneously.

Next, at an injection step S206, the coating material is injected onto the base material. At S206, the coating material is preferably injected onto all the surfaces of each base material.

Next, at a drying step S207, the coating material is dried. Thereby, the coating layers 22 are formed on the front surfaces of the base material.

In addition, at a device attachment step S208, an ID device may be attached to the resin shaped body. The ID device stores identification information identifying resin shaped bodies, and the ID device transmits the identification information to the outside or the identification information is read out from the outside. The ID device may have a circuit that operates through magnetic-flux coupling with an external reading apparatus, a circuit that converts radio waves from the outside into operating power, or the like.

Figure 5A:
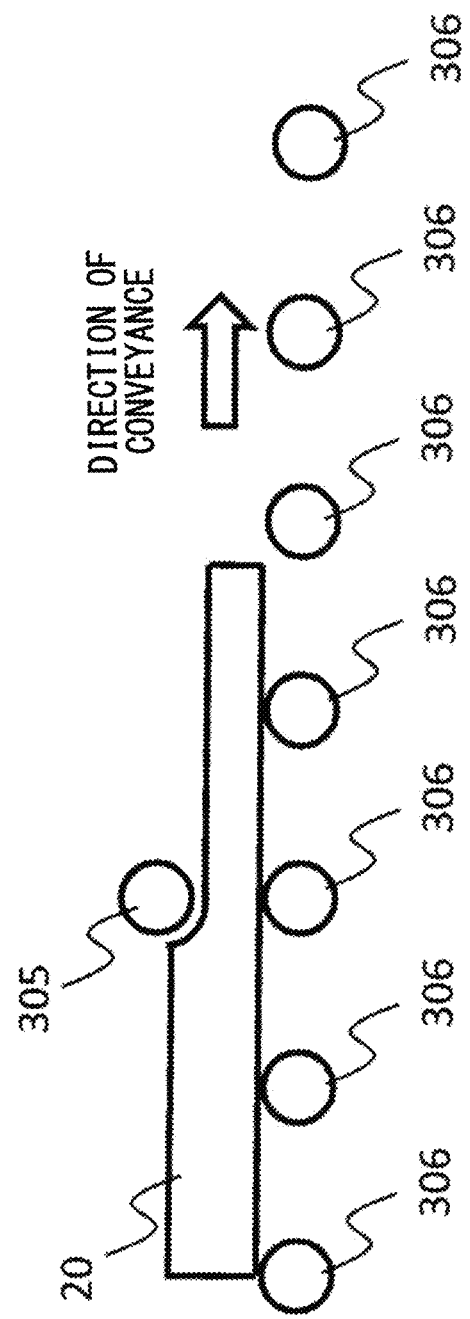
FIG. 5A is a figure for explaining one example of a heating-pressing step S205.

FIG. 5A is a figure for explaining one example of the heating-pressing step S205. In the present example, a plurality of rollers 306 to revolve are used to convey the base material 20. During the conveyance, the base material 20 is heated and pressed by a heating-pressing portion 305. The heating-pressing portion 305 is provided revolvably at a position to face any of the rollers 306. In addition, the heating-pressing portion 305 has a built-in heating means such as heater.

The distance between the roller 306 and the heating-pressing portion 305 is smaller than the thickness of the base material 20 before being heated and pressed. By the base material 20 passing through between the roller 306 and the heating-pressing portion 305, the base material 20 is pressed.

Figure 5B:
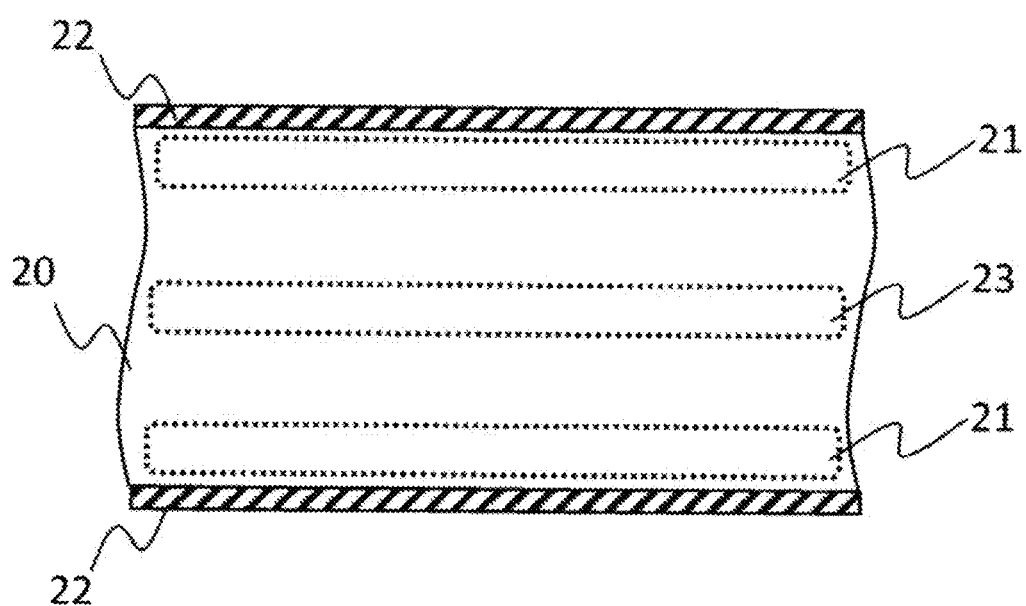
FIG. 5B is a figure showing a base material 20 having front surfaces on which coating layers 22 are formed.

FIG. 5B is a figure showing the base material 20 having front surfaces on which the coating layers 22 are formed. The expansion ratio of the base material 20 at regions 21 on front surface sides is lower than the expansion ratio of the base material 20 at a central region 23. The center of the base material 20 refers to the center of the base material 20 in the thickness direction.

That is, the resin density in the regions 21 is higher than the resin density in the region 23. For example, respective regions obtained by dividing the base material 20 into three equally in the thickness direction are treated as a region 21, a region 23 and a region 21. At this time, the average mass per unit volume of the regions 21 is greater than the average mass per unit volume of the region 23.

With such a structure, diffusion of the coating material into the base material 20 can be suppressed at the injection step S206. Accordingly, the thickness of the coating layers 22 can be controlled accurately. Because of this, the strength of the entire base material 20 and coating layers 22 can be controlled accurately.

Figure 6:
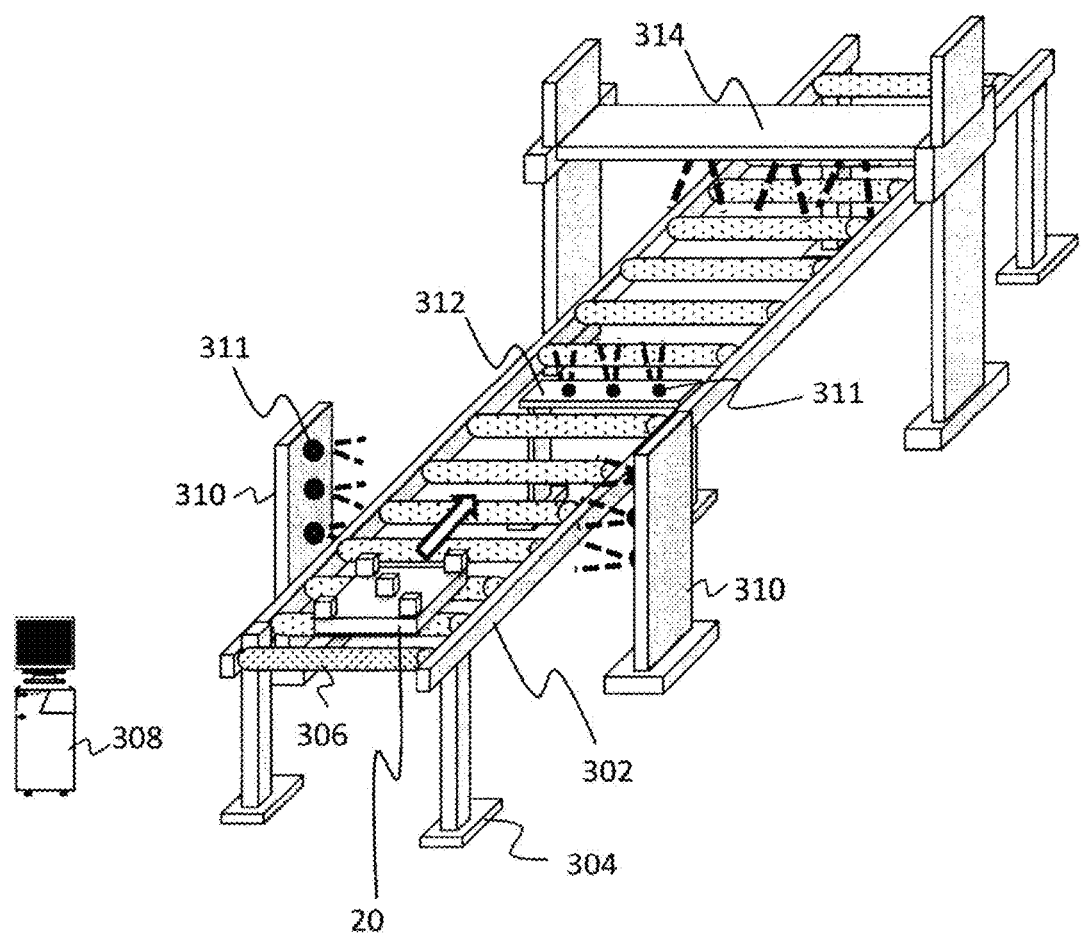
FIG. 6 is a perspective view for explaining one example of a manufacturing apparatus 300 used for an injection step S206.

FIG. 6 is a perspective view for explaining one example of a manufacturing apparatus 300 used for the injection step S206. In the manufacturing apparatus 300 also, the plurality of rollers 306 to revolve are used to convey the base material 20. The apparatuses used for S205 and S206 may be provided integral with each other. That is, the resin shaped body having passed through the apparatus used for S205 is automatically conveyed to the manufacturing apparatus 300 used for S206. In FIG. 6, the palette 100 is shown as one example of resin shaped bodies. If the palette 100 is to be manufactured, an apparatus to bond the plurality of foot portions 16 to the body portion 10 may be provided to be used after the heating-pressing step S205.

The manufacturing apparatus 300 includes a frame body 302, a support portion 304, the plurality of rollers 306, a control apparatus 308, side surface-injection apparatuses 310, a lower surface-injection apparatus 312 and a top surface-injection apparatus 314. The frame body 302 of the present example has two rails arranged in parallel. The plurality of rollers 306 are arrayed between the two rails and along a predetermined direction of conveyance. The frame body 302 has a rotating mechanism to rotate the plurality of rollers 306. The support portion 304 supports the frame body 302 at a predetermined height. In the present example, the base material 20 is conveyed by the respective rollers 306 rotating while being in contact with a surface of the base material 20.

The side surface-injection apparatuses 310 are provided on both sides of the frame body 302. Surfaces of the side surface-injection apparatuses 310 at which they face the frame body 302 are provided with one or more injection ports 311. In the present example, a plurality of the injection ports 311 are arrayed in the height direction. At least one injection port 311 is arranged at a position higher than the conveyance surface on which the base material 20 is conveyed. In addition, at least one injection port 311 may be arranged at a position lower than the conveyance surface. The coating material is injected from the respective injection ports 311. The coating material is a liquid polyurea resin. In FIG. 6, the coating material being injected is schematically shown with broken lines.

The lower surface-injection apparatus 312 has one or more injection ports 311 that face, at a position lower than the conveyance surface for the base material 20, the conveyance surface for the base material 20. In the present example, a plurality of the injection ports 311 are arrayed in a direction orthogonal to the direction of conveyance of the base material 20.

The top surface-injection apparatus 314 has one or more injection ports 311 that face, at a position higher than the conveyance surface for the base material 20, the conveyance surface of the base material 20. In the present example, a plurality of the injection ports 311 are arrayed in a direction orthogonal to the direction of conveyance of the base material 20. The control apparatus 308 causes the respective injection apparatuses to inject the coating material when the base material 20 passes before the respective injection apparatuses.

With such a structure, the coating material can be injected onto the respective surfaces of the resin shaped body. In order for the side surface-injection apparatuses 310 to be able to inject the coating material onto all the side surfaces of the resin shaped body, a mechanism to convey the resin shaped body while rotating it in the conveyance surface may be provided to at least some of the rollers 306.

In addition, a plurality of the side surface-injection apparatuses 310, a plurality of the lower surface-injection apparatuses 312 and/or a plurality of the top surface-injection apparatuses 314 may be provided. In addition, the order of the side surface-injection apparatuses 310, lower surface-injection apparatus 312 and top surface-injection apparatus 314 is not limited to that shown in the example of FIG. 6.

Figure 7A:
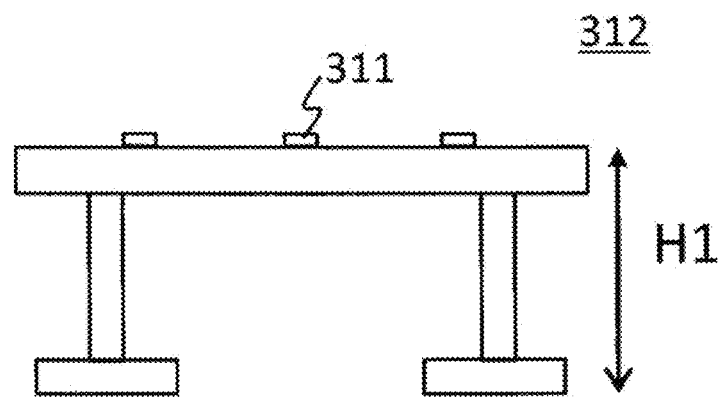
FIG. 7A is a figure for explaining a height H1 of an injection surface of a lower surface-injection apparatus 312.

FIG. 7A is a figure for explaining a height H1 of an injection surface of the lower surface-injection apparatus 312. The injection surface refers to a surface on which injection ports 311 are provided. By adjusting the height H1 of the injection surface, the distance between the injection ports 311 and the resin shaped body can be adjusted. The shorter the distance between the injection ports 311 and the resin shaped body is, the larger the amount of the coating material injected from the injection ports 311 to adhere the base material 20 per unit area is. That is, by adjusting the height H1 of the injection surface, the thickness of a coating layers 22 to be formed on the lower surface of the base material 20 (in the example of FIG. 6, the surface corresponding to the placement surface 12 of the palette 100) can be controlled.

Figure 7B:
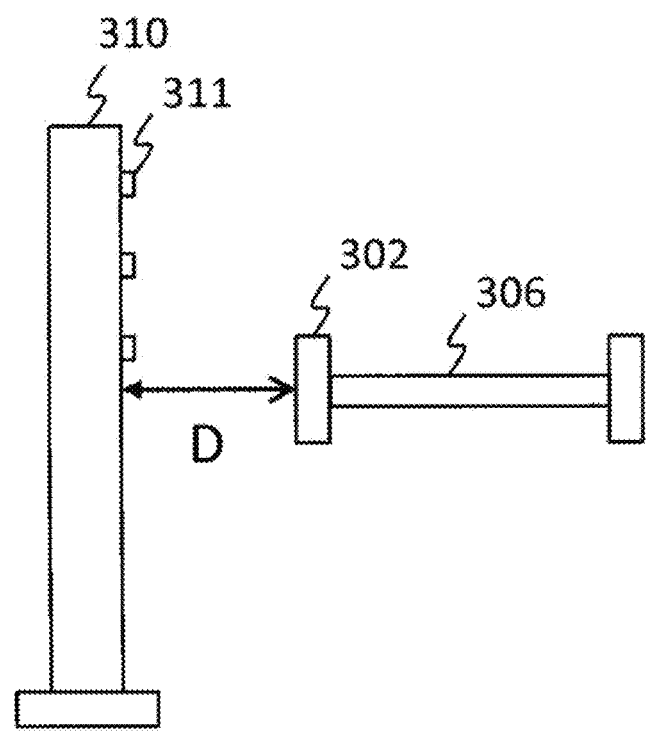
FIG. 7B is a figure for explaining a distance D between an injection surface of a side surface-injection apparatus 310 and a frame body 302.

FIG. 7B is a figure for explaining a distance D between an injection surface of a side surface-injection apparatus 310 and the frame body 302. By adjusting the distance D, the distance between injection ports 311 and the resin shaped body can be adjusted. That is, by adjusting the distance D, the thickness of a coating layer 22 to be formed on a side surface of the base material 20 can be controlled.

Figure 7C:
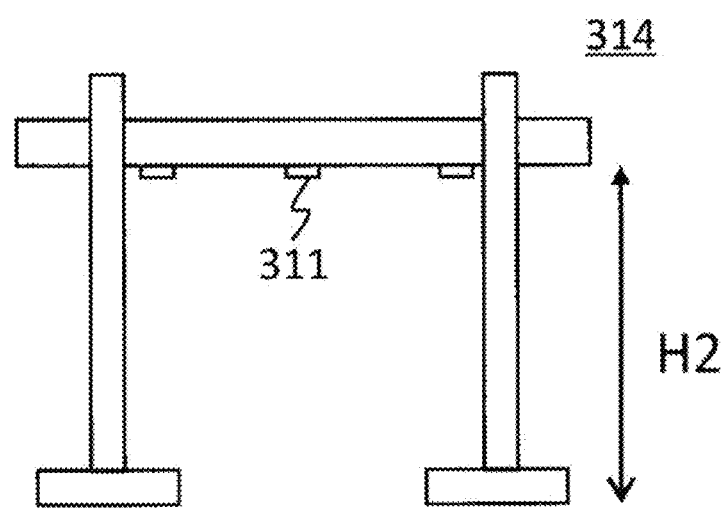
FIG. 7C is a figure for explaining a height H2 of an injection surface of a top surface-injection apparatus 314.

FIG. 7C is a figure for explaining a height H2 of an injection surface of the top surface-injection apparatus 314. By adjusting the height H2 of the injection surface, the distance between injection ports 311 and the resin shaped body can be adjusted. That is, by adjusting the height H2, the thickness of the coating layers 22 to be formed on the top surface of the base material 20 (in the example of FIG. 6, the surface corresponding to the rear surface 14 of the palette 100) can be controlled.

The control apparatus 308 shown in FIG. 6 controls these height H1, distance D and height H2. Thereby, the thicknesses of the coating layers 22 formed on the respective surfaces of the resin shaped body can be controlled independently. The thicknesses of the coating layers 22 formed on the respective surfaces of the resin shaped body may be uniform or may be different from each other. For example, the coating layer 22 formed on the placement surface 12 of the palette 100 may be thicker than a coating layer 22 formed on a side surface of the palette 100. Thereby, the strength of the coating layer 22 to contact an article can be increased.

In the present example, the thickness of the coating material formed on the front surfaces of the base material 20 at the injection step S206 is made proportional to the expansion ratio of the foamed synthetic resin forming the base material 20. The control apparatus 308 controls the thickness of the coating material by adjusting at least one of the speed of conveyance of the base material 20 and the distance between the injection ports of each injection apparatus and the base material 20. For example, if it is desired to increase the thickness of the coating material, the control apparatus 308 lowers the speed of conveyance of the base material 20 or make the distance between the injection ports of each injection apparatus and the base material 20 smaller. The distance can be adjusted based on the above-mentioned height H1, distance D and height H2.

Assuming that the speed of conveyance of the base material 20 by the rollers 306 is V, and the distance between the base material 20 and the injection ports of each injection apparatus is L, the film thickness T1 of a coating layer 22 is inversely proportional to V and inversely proportional to $L^2$. That is, T1 is inversely proportional to $V \times L^2$. The control apparatus 308 may set the speed of conveyance V and distance L based on this relationship. For example, if the thickness of the coating layer 22 is to be doubled, the speed of conveyance V may be set to a half speed, and the distance L may be set to $0.5^{1/2}$-fold.

In addition, the control apparatus 308 may adjust the distance between the injection ports of each injection apparatus and the base material 20 according to the width, length and height of the resin shaped body. For example, the larger the resin shaped body is, the longer the distance is made, to inject the coating material over a wide range uniformly.

If the palette 100 for physical distribution is to be manufactured, the length and width of the palette 100 is stipulated as 1100 mm by JIS, for example. The height H1, distance D and height H2 of each injection apparatus are preferably able to be changed in a range that allows manufacturing of resin shaped bodies with the size.

Figure 8:
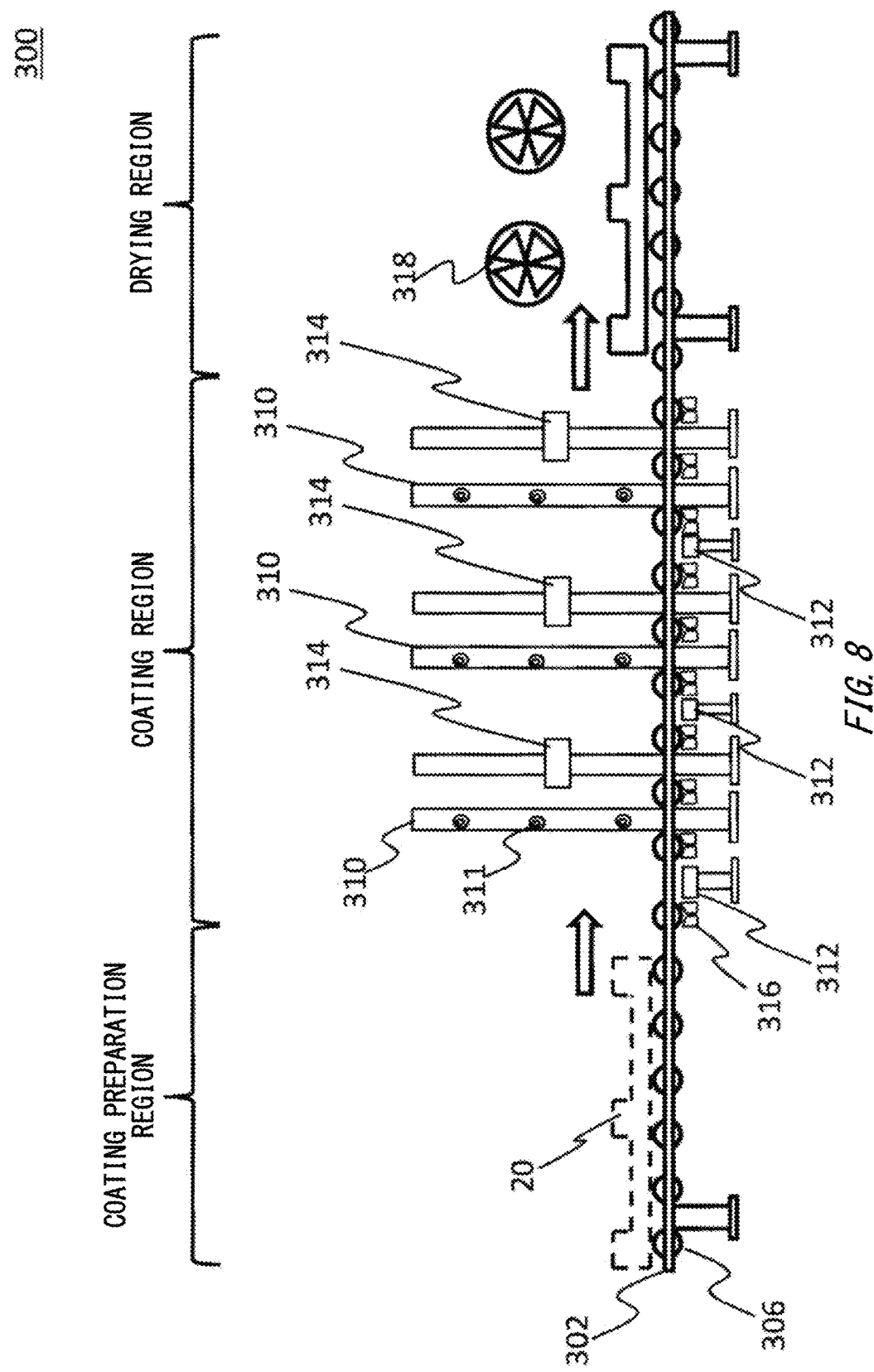
FIG. 8 is a side view of the manufacturing apparatus 300.

FIG. 8 is a side view of the manufacturing apparatus 300. The manufacturing apparatus 300 has a coating preparation region, a coating region and a drying region. A heated and pressed base material 20 is conveyed to the coating preparation region. The base material 20 passes the coating region in which the side surface-injection apparatuses 310, the lower surface-injection apparatus 312 and the top surface-injection apparatus 314 are arranged. Thereby, the coating material is stacked on all the surfaces of the base material 20.

The coating region may be provided with a cover to prevent the coating material from scattering about. The cover preferably surrounds a region in which at least the side surface-injection apparatuses 310, the lower surface-injection apparatus 312 and the top surface-injection apparatus 314 are provided.

The base material 20 having passed the coating region is conveyed to the drying region. One or more drying portions 318 are arranged in the drying region. The drying portions 318 are fans, for example. The drying portions 318 feed air to the coating material formed on the front surfaces of the base material 20. The manufacturing apparatus 300 of the present example has auxiliary members 316 for the respective rollers 306 in the coating region.

Figure 9:
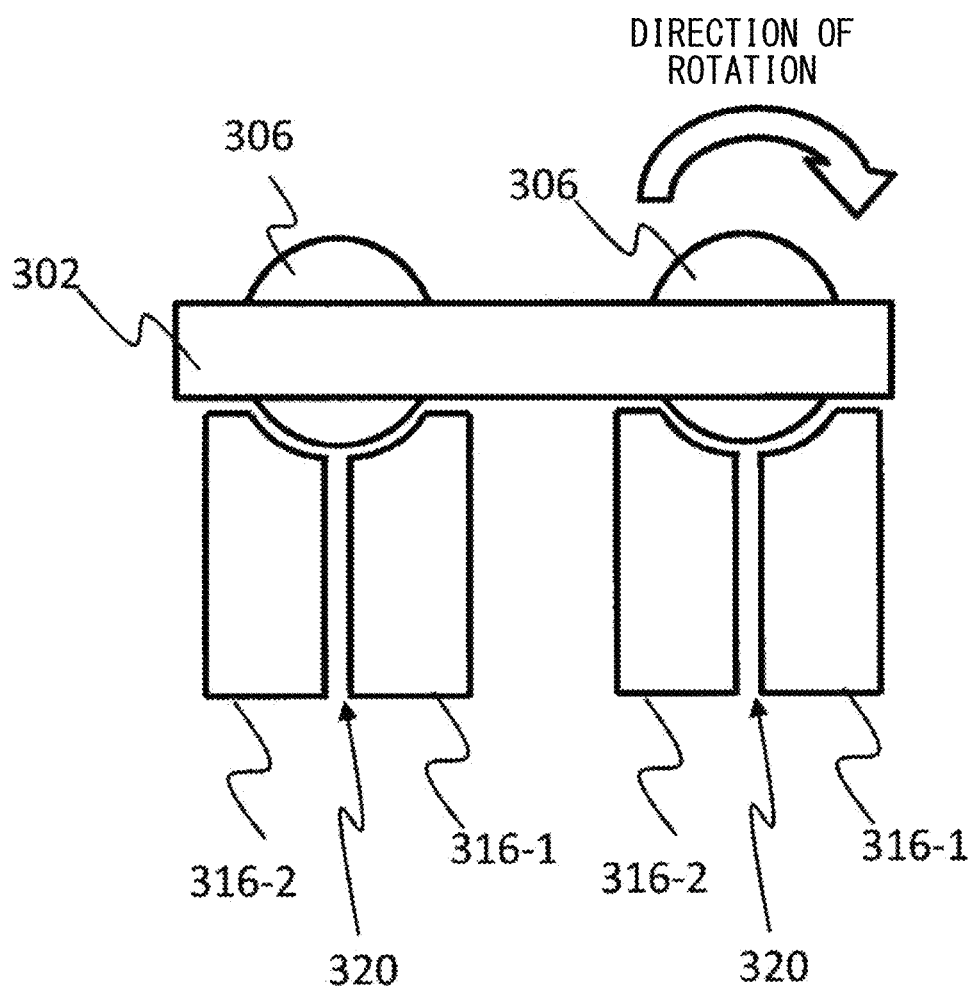
FIG. 9 is a side view showing one example of auxiliary members 316.

FIG. 9 is a side view showing one example of the auxiliary members 316. On the side opposite to the conveyance surface for the base material 20, the auxiliary members 316 are arranged to face the respective rollers 306. In the present example, a first auxiliary member 316-1 and a second auxiliary member 316-2 are provided to each roller 306.

The first auxiliary member 316-1 is arranged upstream of the second auxiliary member 316-2 in the direction of rotation of the rollers 306. The first auxiliary member 316-1 causes the coating material adhered onto the front surface of the roller 306 to be detached from the roller 306. The first auxiliary member 316-1 may have a detaching portion that contacts the front surface of the roller 306 to scrape off the coating material corresponding to rotation of the roller 306. The detached coating material is discharged from an outlet 320.

The second auxiliary member 316-2 applies a detaching material, which facilitates detachment of the coating material, onto the front surface of the roller 306. The detaching material is oil, for example. The second auxiliary member 316-2 may have an applying portion that contacts the front surface of the roller 306 to apply a detaching material corresponding to rotation of the roller 306.

If the apparatus shown in FIG. 5A to FIG. 8 is used, a polyurea resin is injected from injection apparatuses that are installed at an upper portion, a lower portion and side portions of a roller conveyer, while the base materials 20 having a standardized structure and size are moved on the roller conveyer. Thereafter, the polyurea resin is dried to form the polyurea resin coating layers 22 on the front surfaces of the base materials 20. Such a method allows mass production of resin shaped bodies with uniform quality in a short time.

Figure 10A:
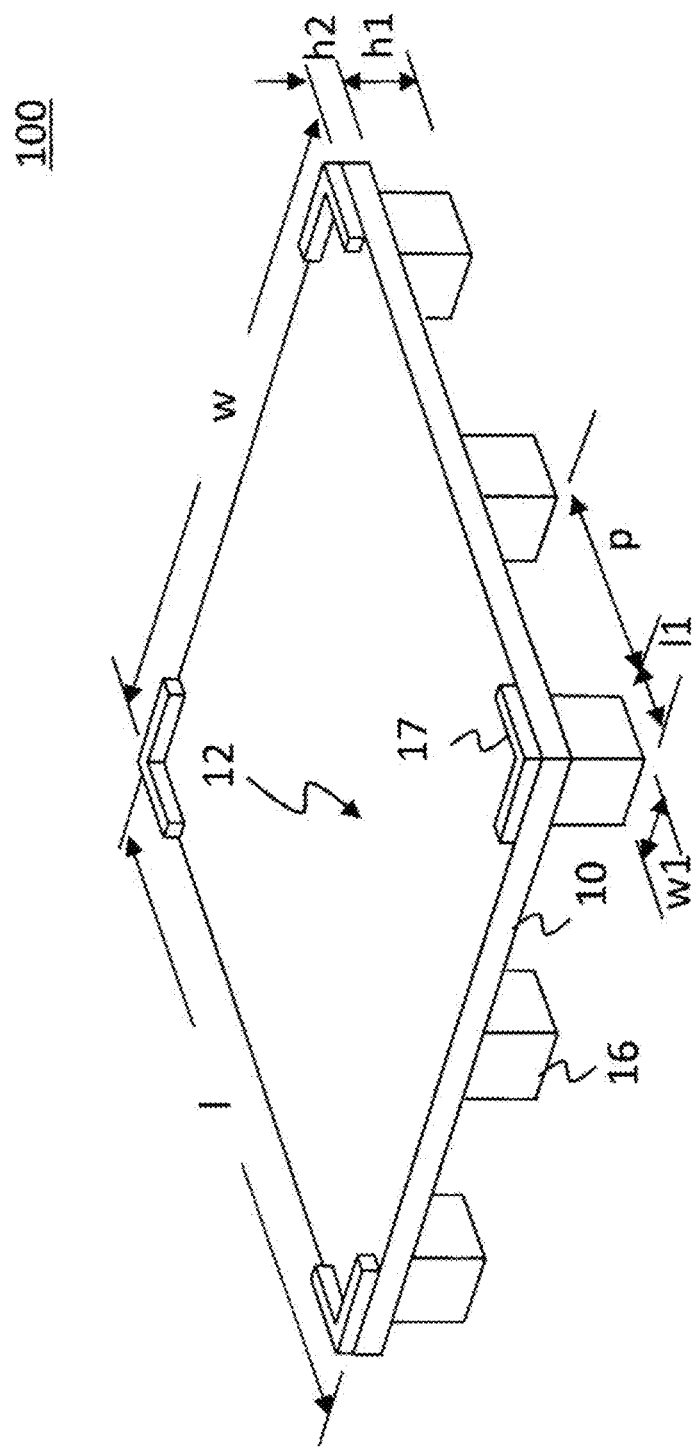
FIG. 10A is a perspective view showing another structural example of the palette 100.

FIG. 10A is a perspective view showing another structural example of the palette 100. The palette 100 of the present example has positioning portions 17 in addition to the structure of the palette 100 shown in FIG. 1. The positioning portions 17 are provided to the placement surface 12. The positioning portions 17 define positions of the foot portions 16 of another palette 100 if the other palette 100 is placed on the placement surface 12. The positioning portions 17 are also formed of the base material 20 and the coating layers 22, similar to other members of the palette 100. The positioning portions 17 may be formed integral with the body portion 10 or may be bonded to the body portion 10.

The positioning portions 17 of the present example are provided at the respective corners of the placement surface 12. The positioning portions 17 are each formed over a predetermined length along two sides that are orthogonal to each other at a corner of the placement surface 12. The length of a positioning portion 17 at each side of the placement surface 12 may be the same as the length of the foot portions 16. The foot portions 16 of the present example have a length l1, a width w1 and a height h1. The length and width of the positioning portions 17 may be the same as those of the foot portions 16. The height of the positioning portions 17 is smaller than the height h1 of the foot portions 16. For example, the height of the positioning portions 17 is equal to or smaller than half of the height of the foot portions 16.

In the present example, the length l and width w of the body portion 10 are equal to each other. In one example, the length l and width w of the body portion 10 is 1100 mm. In addition, the height h2 of the body portion 10 is 30 mm. In addition, the length l1, width w1 and height h1 of the foot portions 16 are 100 mm. In addition, an interval p between the respective foot portions 16 is 400 mm.

Figure 10B:
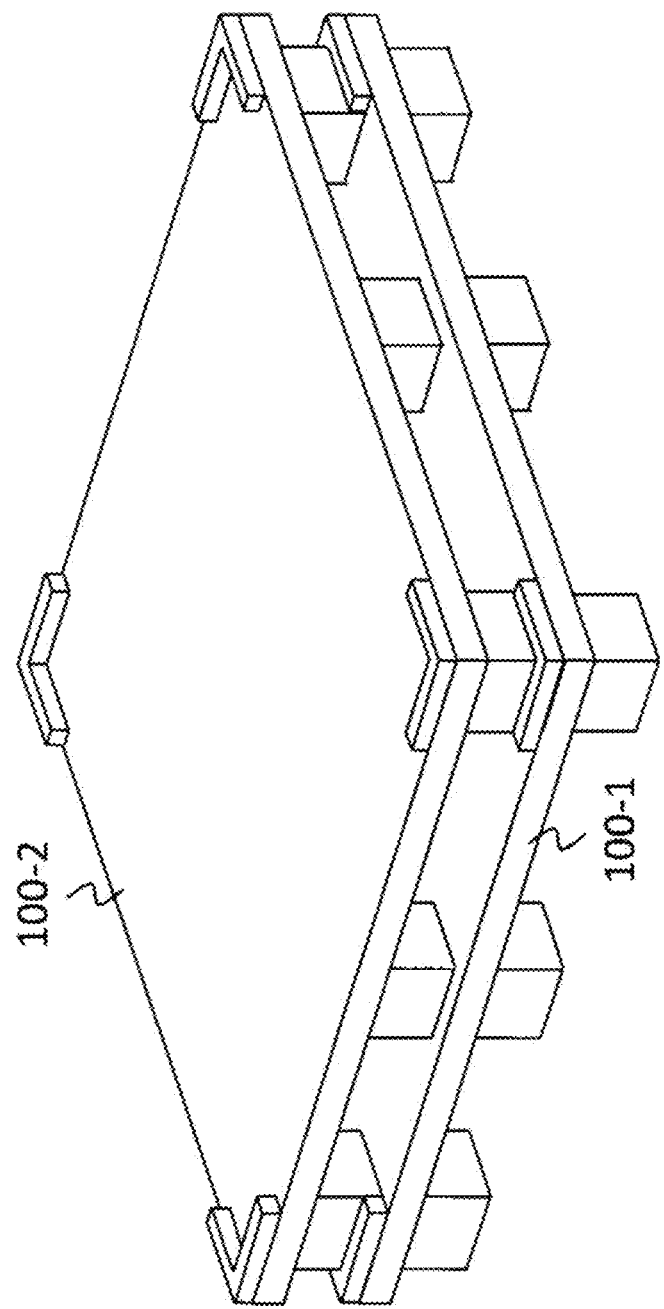
FIG. 10B is a perspective view showing two stacked palettes 100.

FIG. 10B is a perspective view showing two stacked palettes 100. The positions of the foot portions 16 of an upper palette 100-2 are defined by the positioning portions 17 of a lower palette 100-1.

Figure 11:
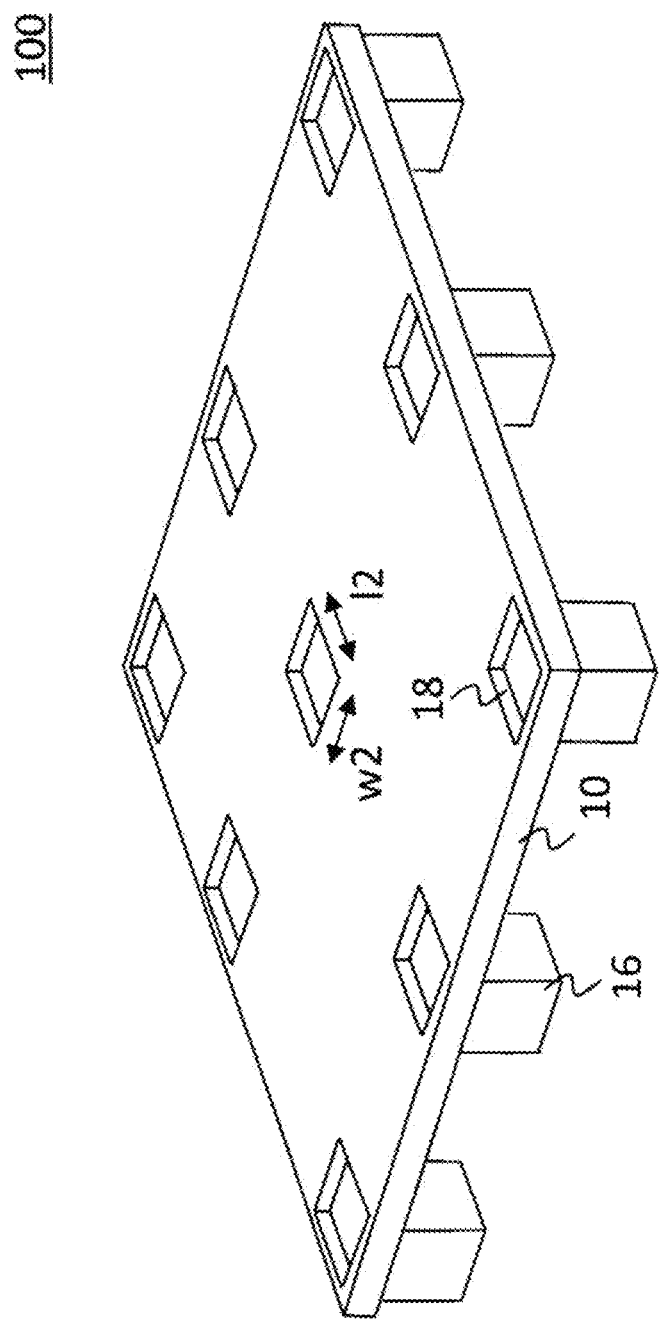
FIG. 11 is a perspective view showing another structural example of the palette 100.

FIG. 11 is a perspective view showing another structural example of the palette 100. The palette 100 of the present example has positioning portions 18 in addition to the structure of the palette 100 shown in FIG. 1. The positioning portions 18 are provided to the placement surface 12. The positioning portions 18 are provided at positions to face the respective foot portions 16.

The positioning portions 18 are hollows provided to the placement surface 12. The depth of the positioning portions 18 is smaller than the thickness of the body portion 10. That is, the positioning portions 18 do not penetrate the body portion 10. The depth of the positioning portions 18 is equal to or smaller than half of the thickness of the body portion 10, for example. In addition, a length l2 and width w2 of the positioning portions 18 are equal to or slightly larger than the length l1 and width w1 of the foot portions 16. Such a structure also can facilitate stacking of a plurality of the palettes 100.

Figure 12:
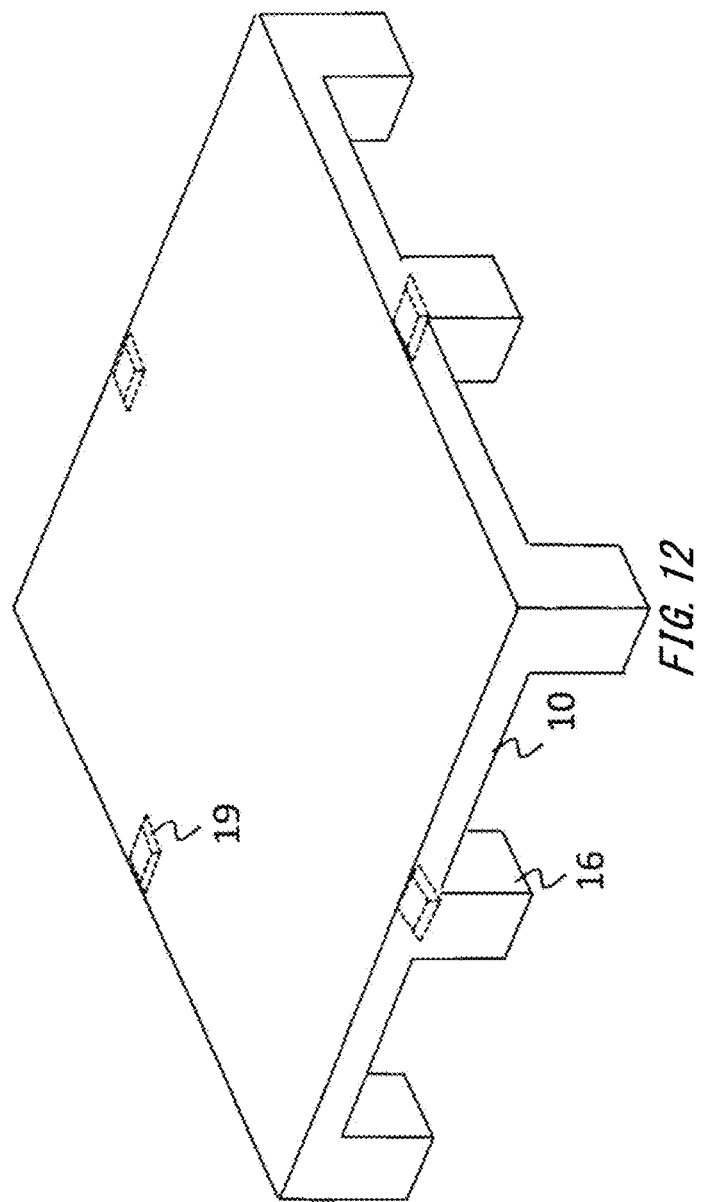
FIG. 12 is a perspective view showing another structural example of the palette 100.

FIG. 12 is a perspective view showing another structural example of the palette 100. An ID device 19 is fixed to the palette 100 of the of the present example. The ID device 19 stores information identifying the palette 100, and transmits the identification information to the outside. For example, by bringing a reading apparatus close to the ID device 19, it reads out the identification information of the palette 100.

In the palette 100, a plurality of the ID devices 19 may be provided symmetrically about the middle of the body portion 10. For example, the ID devices 19 may each be provided to the middle of each side of the body portion 10. Thereby, identification information can be read out from the ID devices 19, without having to take the orientation of the palette 100 into consideration. The ID devices 19 may be embedded in the foot portions 16. The ID devices 19 of the present example can be applied to any of the examples shown in FIG. 1, FIG. 10A and FIG. 11.

In addition, in the palette 100 shown in FIG. 1, FIG. 10A and FIG. 11, the respective foot portions 16 may have cavities. Thereby, the palette 100 can further be made light-weight. In addition, the ID devices 19 may be housed in the cavities. In addition, the ID devices 19 may be pasted onto the rear surface of the body portion 10.

In addition, the ID devices 19 may store information indicting the condition of the palette 100 such as positional information. The information may be written by an external writing apparatus. The ID devices 19 may send the information at a predetermined cycle using Bluetooth® Low Energy (BLE), for example. A built-in receiver in a mobile terminal or the like may receive the information. The mobile terminal may transmit the received information to a cloud server or the like. By accessing the cloud server with the mobile terminal or the like, the conditions of the respective palettes 100 can be grasped.

Figure 13:
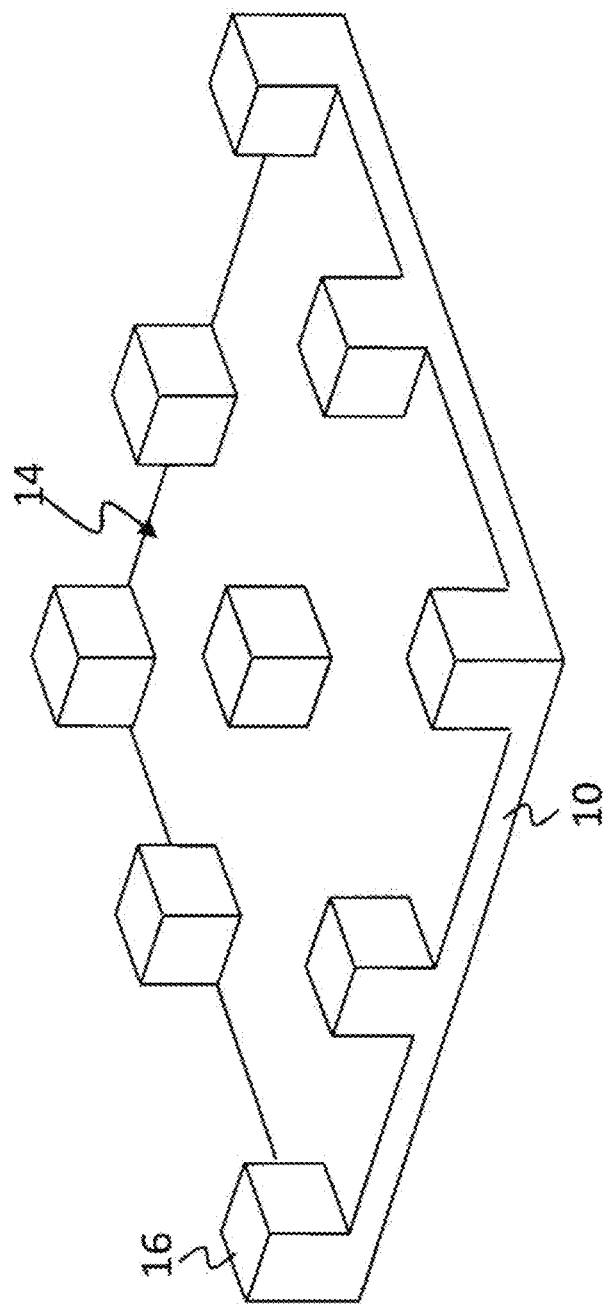
FIG. 13 is a perspective view showing an array example of foot portions 16 on a rear surface 14 of a body portion 10.

FIG. 13 is a perspective view showing an array example of the foot portions 16 on the rear surface 14 of the body portion 10. The present example corresponds to the palette 100 shown in FIG. 1. Among the plurality of foot portions 16, foot portions 16 that are provided along the circumference of the body portion 10 are arranged to be flush with the side surface of the body portion 10. In addition, a foot portion 16 is arranged on the inner side of the body portion 10, at the same interval from the circumference of the body portion 10.

Figure 14:
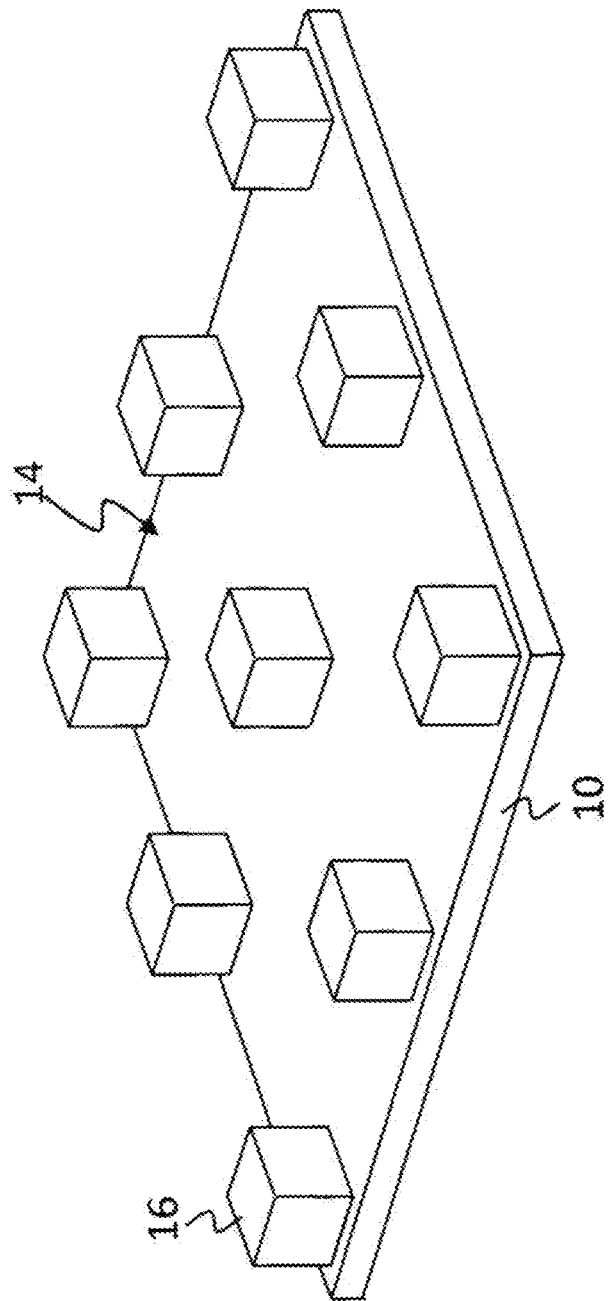
FIG. 14 is a perspective view showing another array example of the foot portions 16.

FIG. 14 is a perspective view showing another array example of the foot portions 16. The present example corresponds to the palette 100 shown in FIG. 10A and FIG. 11. Among the plurality of foot portions 16, foot portions 16 that are provided along the circumference of the body portion 10 are arranged on the inner side relative to the side surfaces of the body portion 10. Thereby, if the palettes 100 are stacked, the foot portions 16 of an upper palette 100 are positioned by the positioning portions of a lower palette 100. A foot portion 16 is arranged on the inner side of the body portion 10, at the same interval from the circumference of the body portion 10.

Figure 15A:
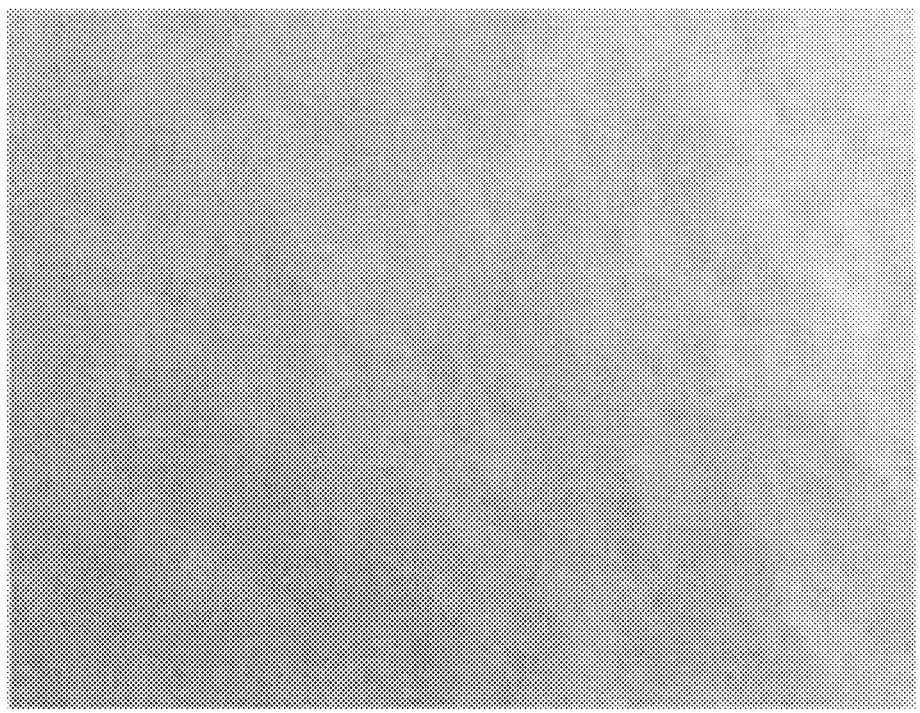
FIG. 15A is a figure showing one example of a surface condition of the palette 100.
Figure 15B:
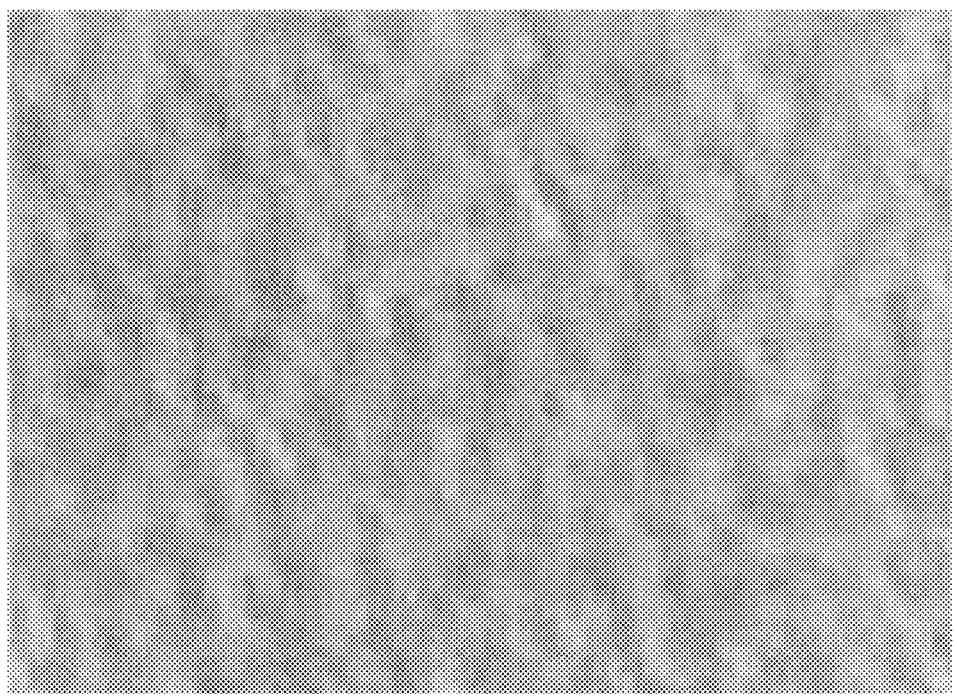
FIG. 15B is a figure showing another example of a surface condition of the palette 100.

FIG. 15A is a figure showing one example of a surface condition of the palette 100. FIG. 15B is a figure showing another example of a surface condition of the palette 100. The front surface of the palette 100 shown in FIG. 15A (that is, a front surface of a coating layer 22) is less uneven than a front surface of the palette 100 shown in FIG. 15B.

The condition shown in FIG. 15B can be realized by injecting the coating material multiple times with different injection amounts. Specifically, first, the coating material is injected onto all the surfaces of the base material 20 at a predetermined injection amount. Thereby, the front surface of the palette 100 attains a less uneven condition shown in FIG. 15A.

Next, the coating material is injected onto the base material 20 with an injection amount of the coating material reduced from the first coating. At this time, the injection amount of the coating material is reduced, to the extent that the coating material adheres sparsely onto the front surfaces of the base material 20. Thereby, the front surface of the palette 100 attains the condition shown in FIG. 15B.

The control apparatus 308 shown in FIG. 6 may control the unevenness condition of the front surfaces of resin shaped bodies according to uses of the resin shaped bodies. For example, if it is desired to increase a coefficient of friction of a surface, a more uneven coating layer 22 is formed on the surface. In addition, if it is not necessary to increase a coefficient of friction of a surface, a less uneven coating layer 22 is formed on the surface. A less uneven coating layer 22 can attain a condition which resembles a mirror surface, and can realize an antibacterial action. For example, relatively more uneven coating layers 22 are formed on the placement surface 12 and rear surface 14 of the palette 100, and relatively less uneven coating layers 22 are formed on side surfaces.

Figure 16:
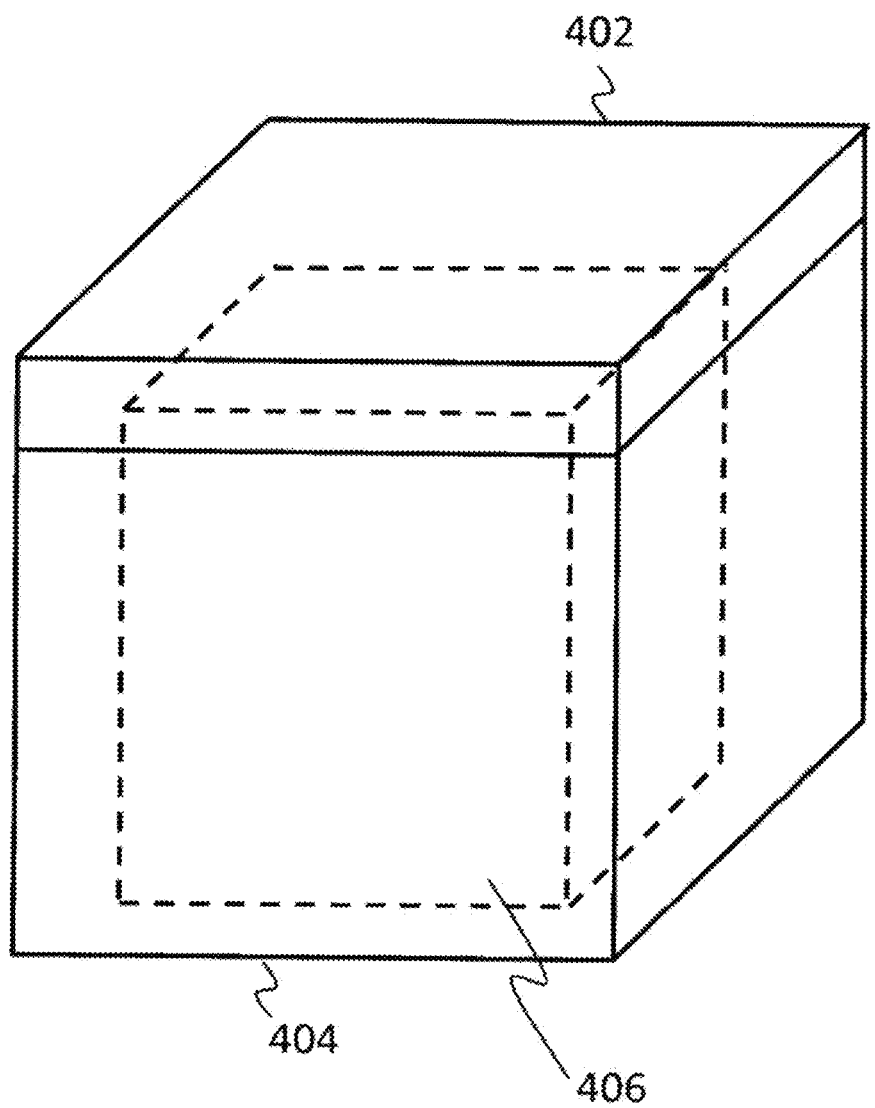
FIG. 16 is a perspective view showing one example of a box 400 according to a second embodiment of the present invention.

FIG. 16 is a perspective view showing one example of a box 400 according to a second embodiment of the present invention. The box 400 has an internal space 406. The box 400 of the present example has a housing portion 404 and a lid portion 402. A hollow as the internal space 406 is formed in the housing portion 404. The lid portion 402 is placed at an upper portion of the housing portion 404 to close up the internal space 406 tightly. The lid portion 402 may be fixed to the housing portion 404 by part of the lid portion 402 being inserted into the internal space 406. The box 400 is used as a cooler box to house perishable foodstuff or the like, for example, but this is not the sole use of the box 400.

Figure 17:
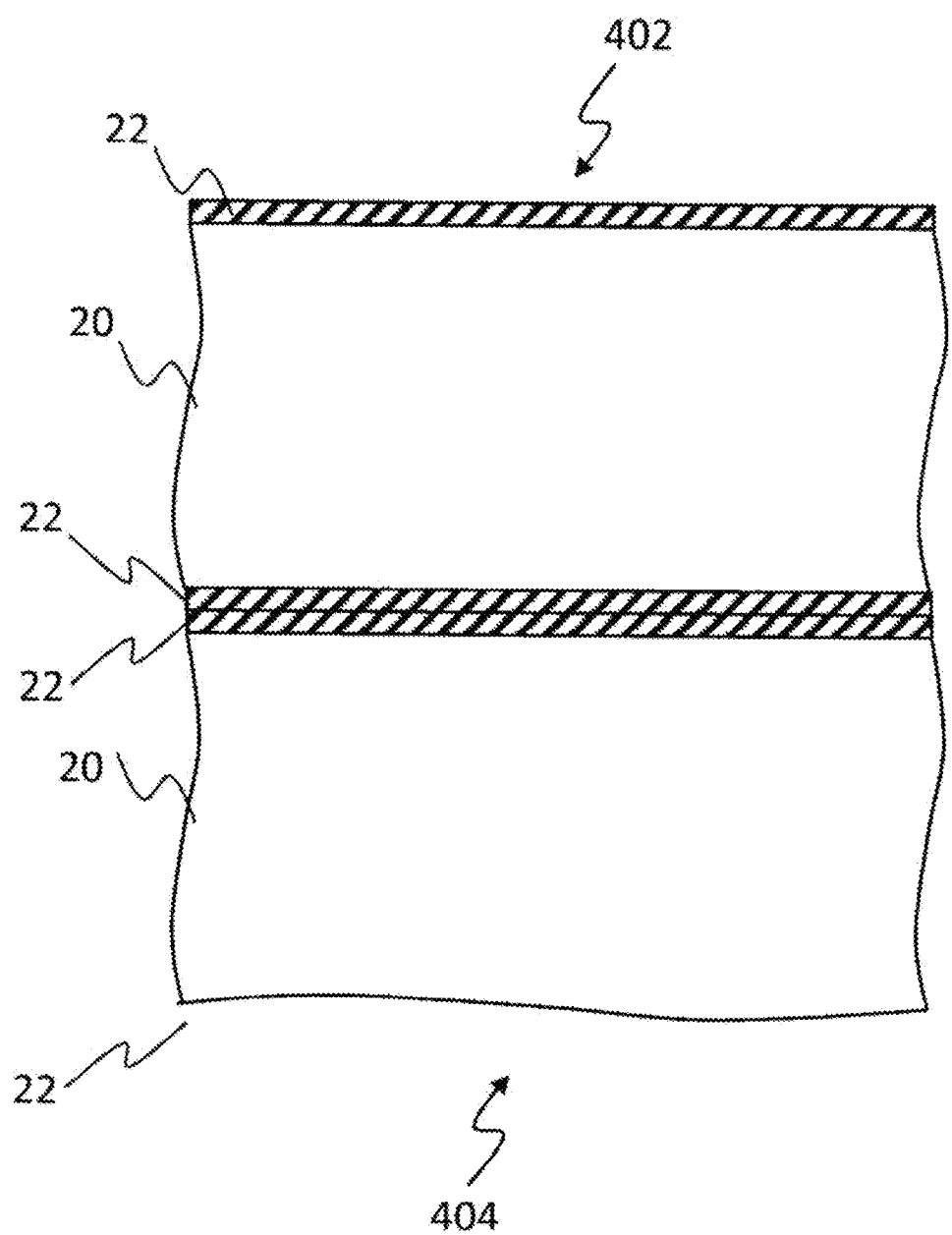
FIG. 17 is a figure showing partial cross-sections of a lid portion 402 and a housing portion 404.

FIG. 17 is a figure showing partial cross-sections of a lid portion 402 and a housing portion 404. The lid portion 402 and the housing portion 404 have the base materials 20 and coating layers 22, similar to the palette 100 shown in FIG. 2. The base materials 20 have shapes that are similar to those of the lid portion 402 and housing portion 404 shown in FIG. 16.

The coating layers 22 cover the front surfaces of the base materials 20. The coating layers 22 of the present example cover all the surfaces of the base materials 20 corresponding to the lid portion 402 and the housing portion 404. For example, the coating layers 22 are formed on the entire outer surface of the box 400 and are formed on the entire inner wall of the internal space 406.

In addition, a coating layer 22 is formed also on a surface that is part of the lid portion 402 and faces the housing portion 404 as shown in FIG. 17. In addition, a coating layer 22 is formed also on the surface that is part of the housing portion 404 and faces the lid portion 402.

The coating layers 22 at the outer surfaces of the box 400 may be more uneven than the coating layers 22 at the inner walls of the internal space 406. Thereby, the coefficient of friction of the outer surfaces of the box 400 is increased to facilitate carriage or the like, and an antibacterial condition of the inner walls of the internal space 406 can be attained. Such a structure makes it possible to provide a light-weight and high strength box 400.

Figure 18:
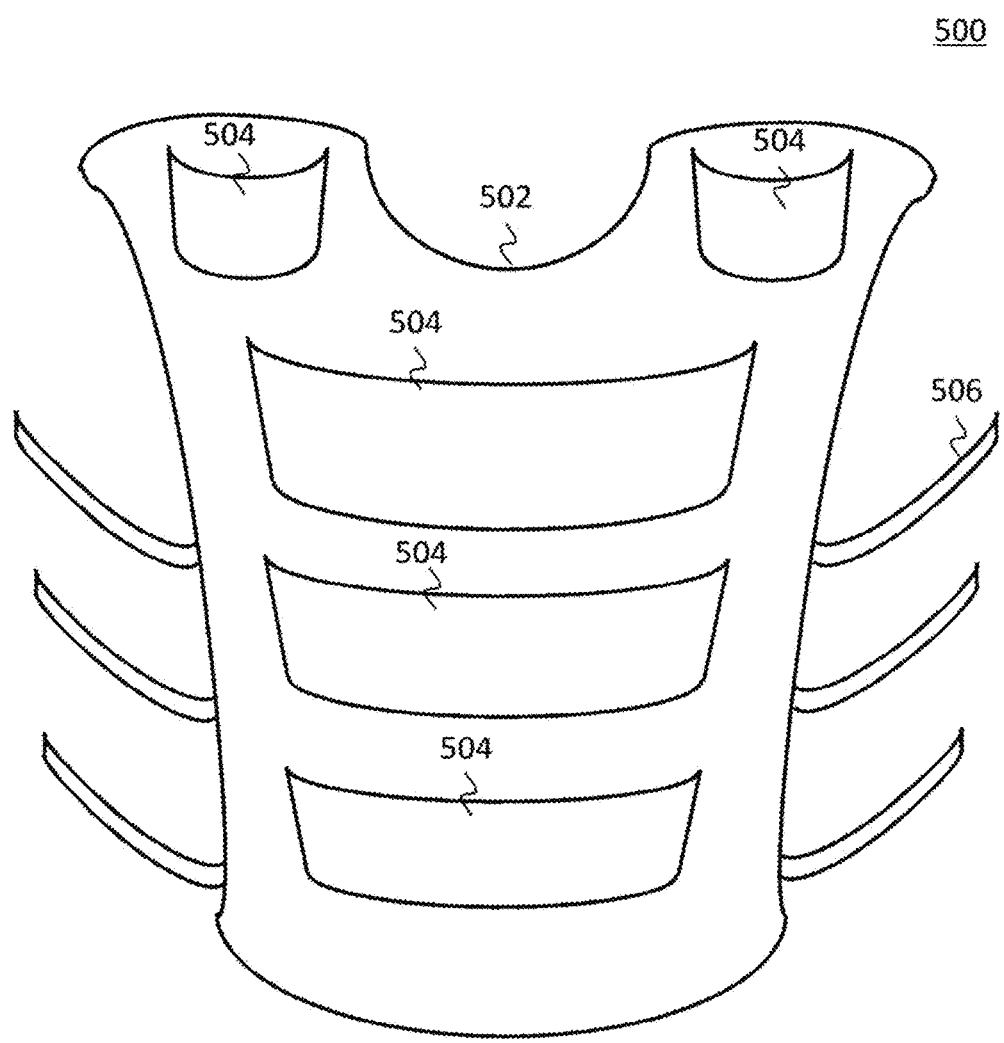
FIG. 18 is a plan view showing one example of a gear 500 according to a third embodiment of the present invention.

FIG. 18 is a plan view showing one example of a gear 500 according to a third embodiment of the present invention. The gear 500 is attached to a target such as a living body. The gear 500 shown in FIG. 18 is a protector to cover at least part of the chest and abdomen of a human body.

The gear 500 of the present example has a body 502, shock absorbing portions 504 and fixing portions 506. The body 502 may be formed of a material softer than the shock absorbing portions 504. The fixing portions 506 fix the body 502 to the target. The fixing portions 506 are belts or the like.

The shock absorbing portions 504 are provided to a partial region of the body 502. The shock absorbing portions 504 may be fit into a region formed by hollowing out part of the body 502 or may be pasted onto the front surface of the body 502. The gear 500 may not have the body 502, but be entirely the shock absorbing portions 504.

Figure 19:
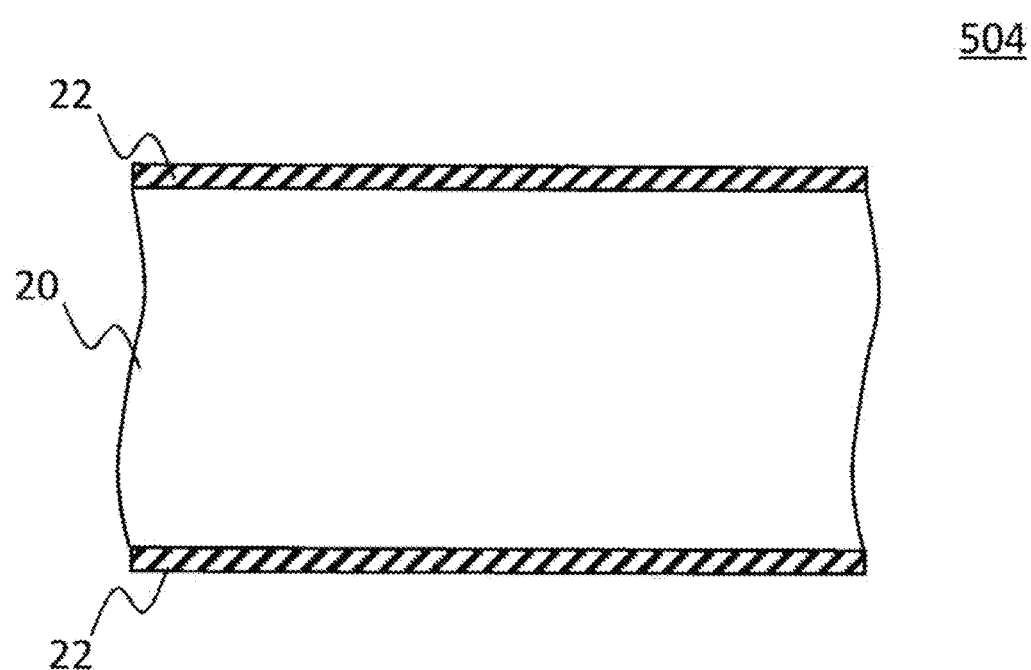
FIG. 19 is a figure showing a partial cross-section of a shock absorbing portion 504.

FIG. 19 is a figure showing a partial cross-section of a shock absorbing portion 504. The shock absorbing portion 504 has the base material 20 and coating layers 22, similar to the palette 100 shown in FIG. 2. The base material 20 has a shape similar to that of the shock absorbing portions 504 shown in FIG. 18.

The coating layers 22 cover the front surfaces of the base material 20. The coating layers 22 of the present example cover all the surfaces of the base material 20. Such a structure makes it possible to provide a light-weight and high strength gear 500.

Figure 20:
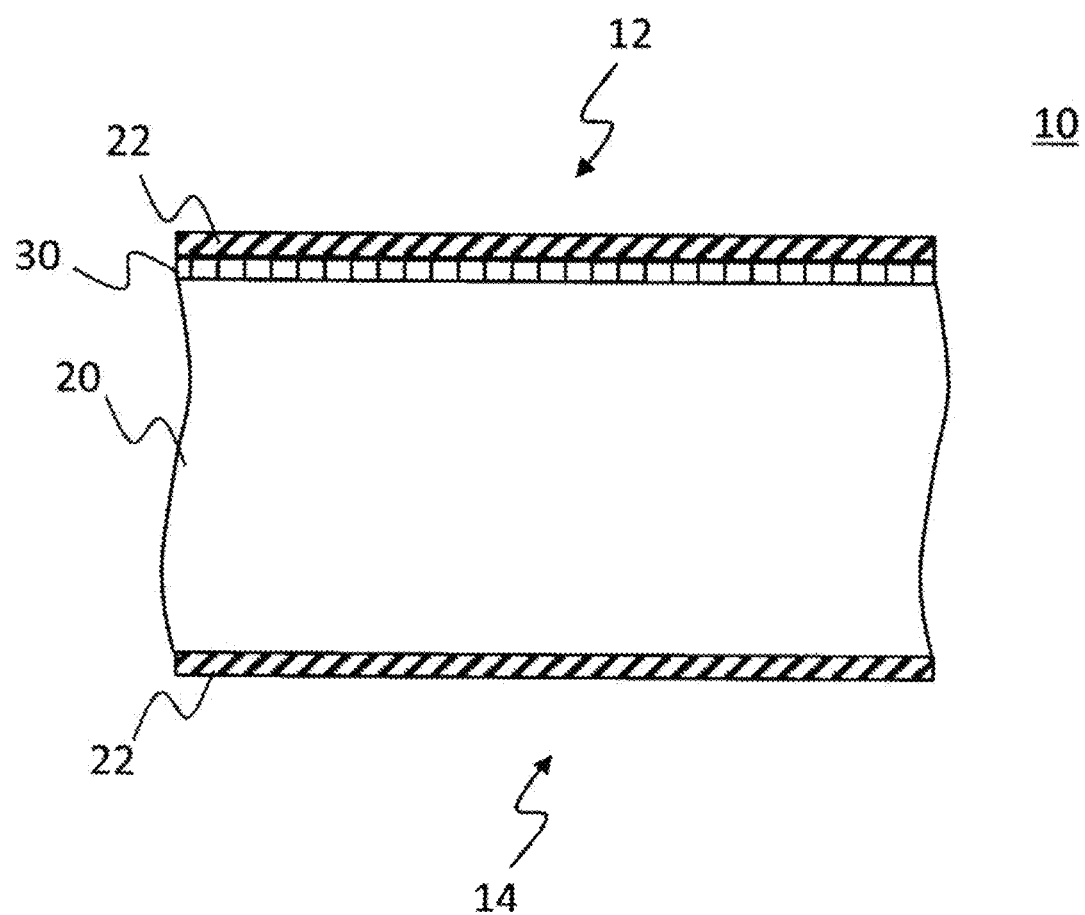
FIG. 20 is a figure showing another example of a partial cross-section of the palette 100 shown in FIG. 1.

FIG. 20 is a figure showing another example of a partial cross-section of the palette 100 shown in FIG. 1. Similar to FIG. 2, FIG. 20 shows a cross-section at part of the body portion 10. The palette 100 of the present example further includes a fiber sheet 30, in addition to the base material 20 and coating layers 22 shown in FIG. 2.

The fiber sheet 30 is provided between the base material 20 and a coating layer 22. The fiber sheet 30 may have a higher cutting strength than that of the coating layers 22. In addition, the fiber sheet 30 may be more fire-resistant than the coating layers 22 are. The fiber sheet 30 may be a sheet containing carbon fibers formed by carbonizing fibers formed of a predetermined material. In addition, the fiber sheet 30 may be a basalt fiber sheet. The basalt fiber sheet is a sheet containing fibers formed by melting basalt.

While containing silicon dioxide ($SiO_2$) as its main component, the basalt fiber sheet contains aluminum oxide ($Al_2O_3$), calcium oxide (CaO), magnesium oxide (MgO), sodium oxide ($Na_2O$), potassium oxide ($K_2O$), titanium oxide ($TiO_2$), ferric oxide $Fe_2O_3$+FeO) or the like. The content percentages by weight ratio of the respective components are as follows: $SiO_2$: approximately 51 to 60%; $Al_2O_3$: approximately 14 to 19%; CaO: approximately 5 to 10%; MgO: approximately 3 to 6%; $Na_2O+K_2O$: approximately 3 to 6%; $TiO_2$: approximately 0 to 3%; and $Fe_2O_3$+FeO: approximately 9 to 14%. The basalt fiber sheet may further contain other components.

The fiber sheet 30 is provided at least in a partial region of the placement surface 12 of the palette 100. The fiber sheet 30 may be provided also on the rear surface 14 of the palette 100 or may be provided on side surfaces.

The fiber sheet 30 may be thinner than the coating layers 22. The thickness of the fiber sheet 30 may be equal to or smaller than 1 mm, or may be equal to or smaller than 0.6 mm. By using such a fiber sheet 30, the strength of the palette 100 can be enhanced without having to increase its thickness much.

In addition, the volume of space included in a unit volume of the fiber sheet 30 may be smaller than the volume of bubbles contained in a unit volume of the base material 20. That is, it may be more difficult for a material for forming a coating layer 22 to be soaked into the fiber sheet 30 than into the base material 20. Thereby, while enhancing the strength of the palette 100, the amount of the coating material required to form the coating layers 22 with a predetermined thickness can be reduced.

Figure 21:
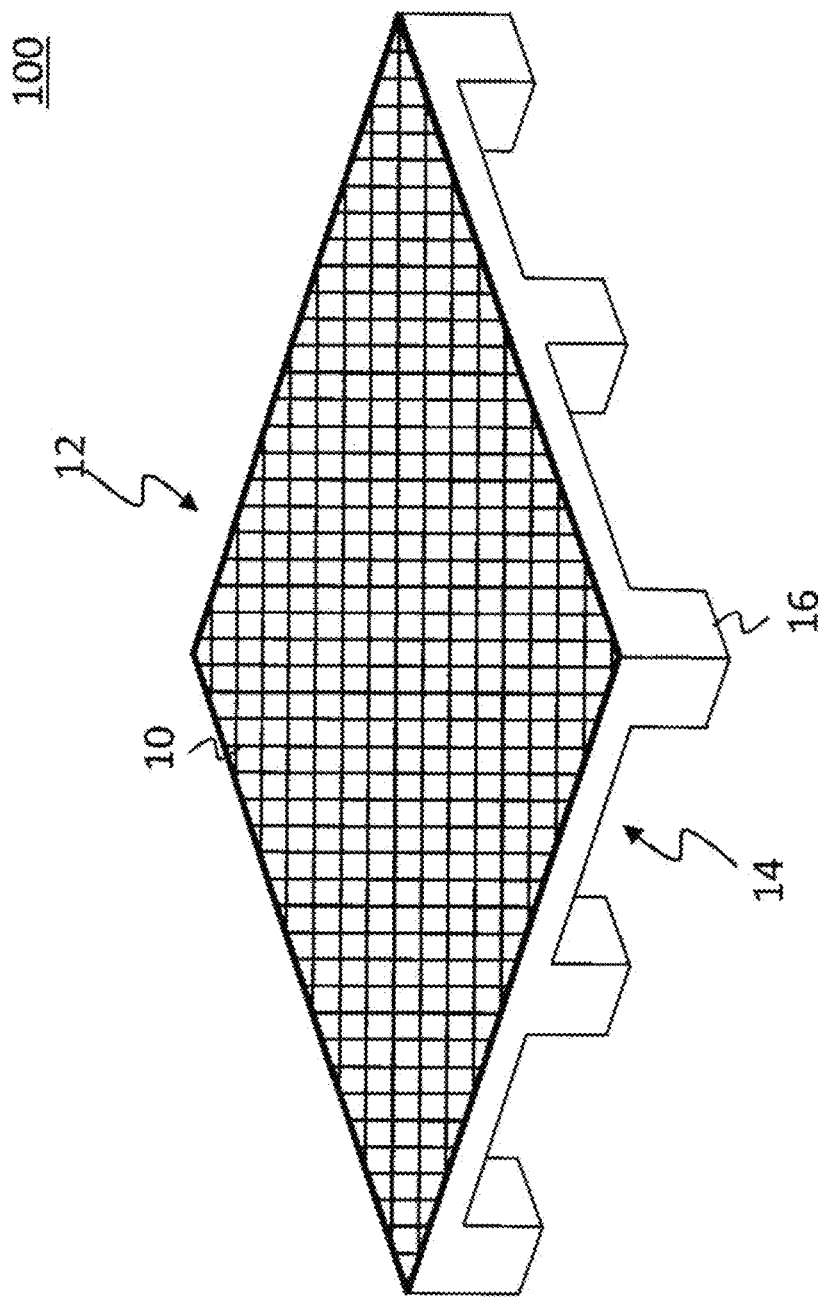
FIG. 21 is a figure showing an example of a range in the palette 100 over which a fiber sheet 30 is provided.

FIG. 21 is a figure showing an example of a range in the palette 100 over which the fiber sheet 30 is provided. In FIG. 21, a range over which the fiber sheet 30 is provided is hatched. In the palette 100 of the present example, the fiber sheet 30 is provided to the entire placement surface 12 of the palette 100. In addition, the fiber sheet 30 is not provided to surfaces other than the placement surface 12. Thereby, the strength of the surface on which articles are placed can be enhanced.

Figure 22:
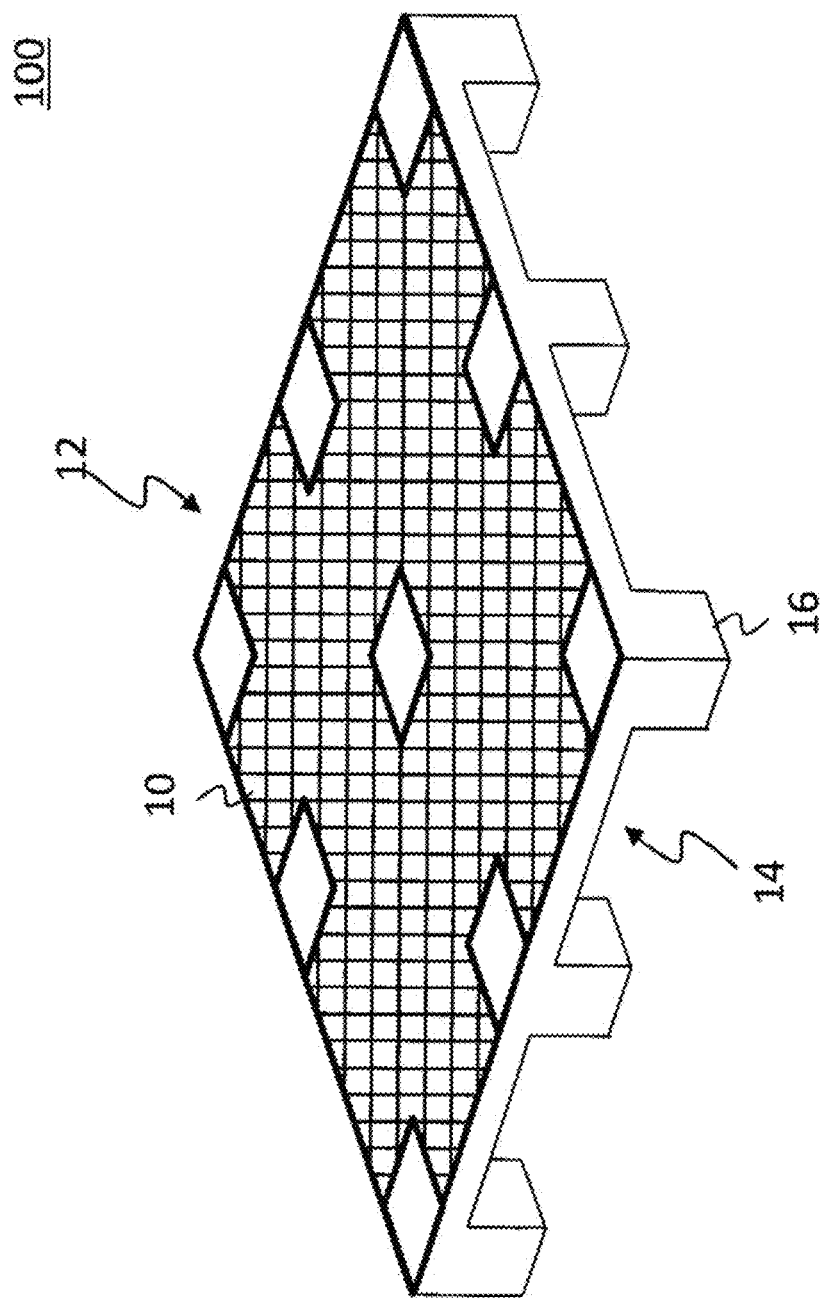
FIG. 22 is a figure showing another example of a range in the palette 100 over which the fiber sheet 30 is provided.

FIG. 22 is a figure showing another example of the range in the palette 100 over which the fiber sheet 30 is provided. In the palette 100 of the present example, the fiber sheet 30 is provided in regions of the placement surface 12 that are other than regions to face the foot portions 16. In addition, the rear surface and side surfaces of the palette 100 are not provided with the fiber sheet 30. Thereby, portions with relatively low strengths against a load from above can be reinforced. In addition, by forming a coating layer 22 with a uniform thickness on the fiber sheet 30 in a pattern shown in FIG. 22, hollows can be formed in regions where the fiber sheet 30 is not arranged. The hollows can also be used as the positioning portions 18 shown in FIG. 11.

Figure 23:
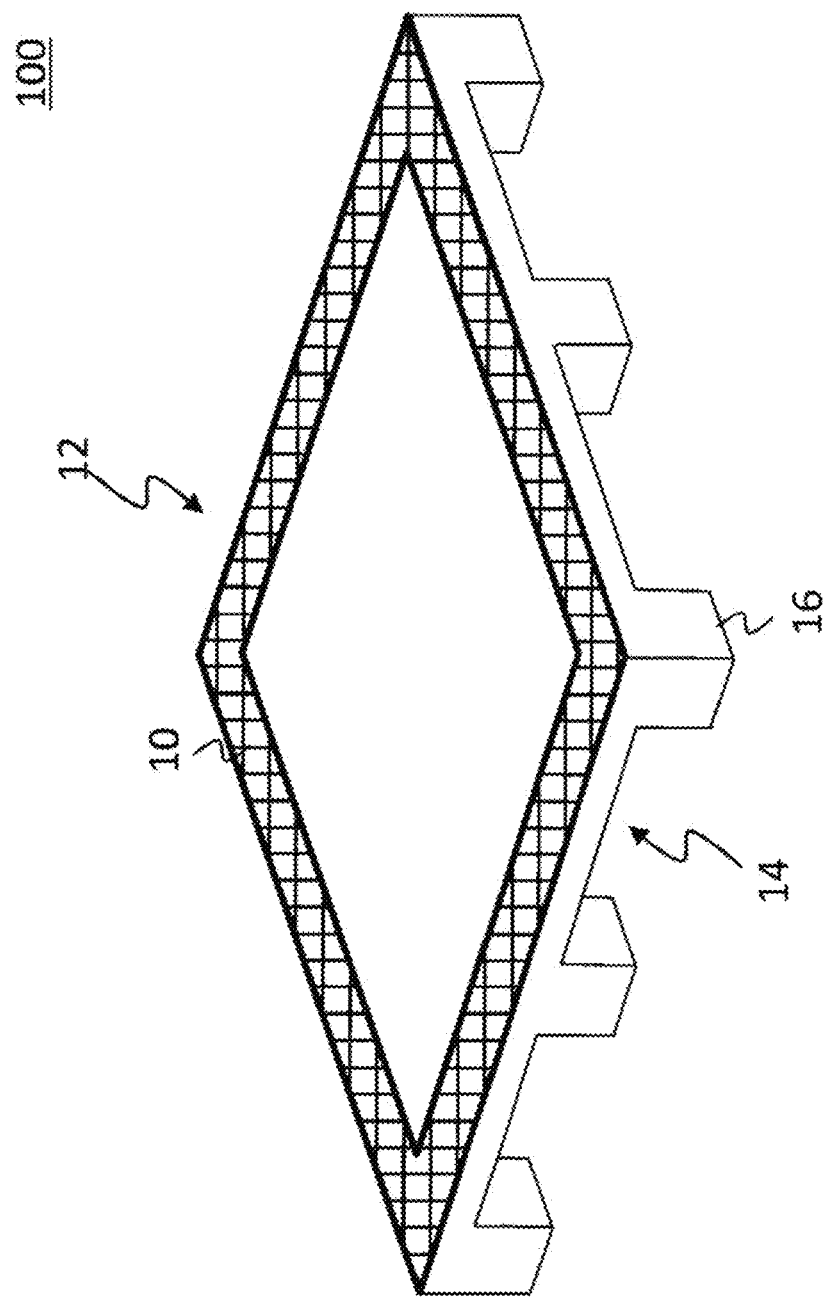
FIG. 23 is a figure showing another example of a range in the palette 100 over which the fiber sheet 30 is provided.

FIG. 23 is a figure showing another example of a range in the palette 100 over which the fiber sheet 30 is provided. In the palette 100 of the present example, the fiber sheet 30 is provided at edge portions of the placement surface 12. In addition, the fiber sheet 30 is not provided to portions other than the edge portions of the placement surface 12. Thereby, portions with relatively insufficient strengths can be reinforced, and the amount of the fiber sheet 30 to be used can be reduced.

Figure 24:
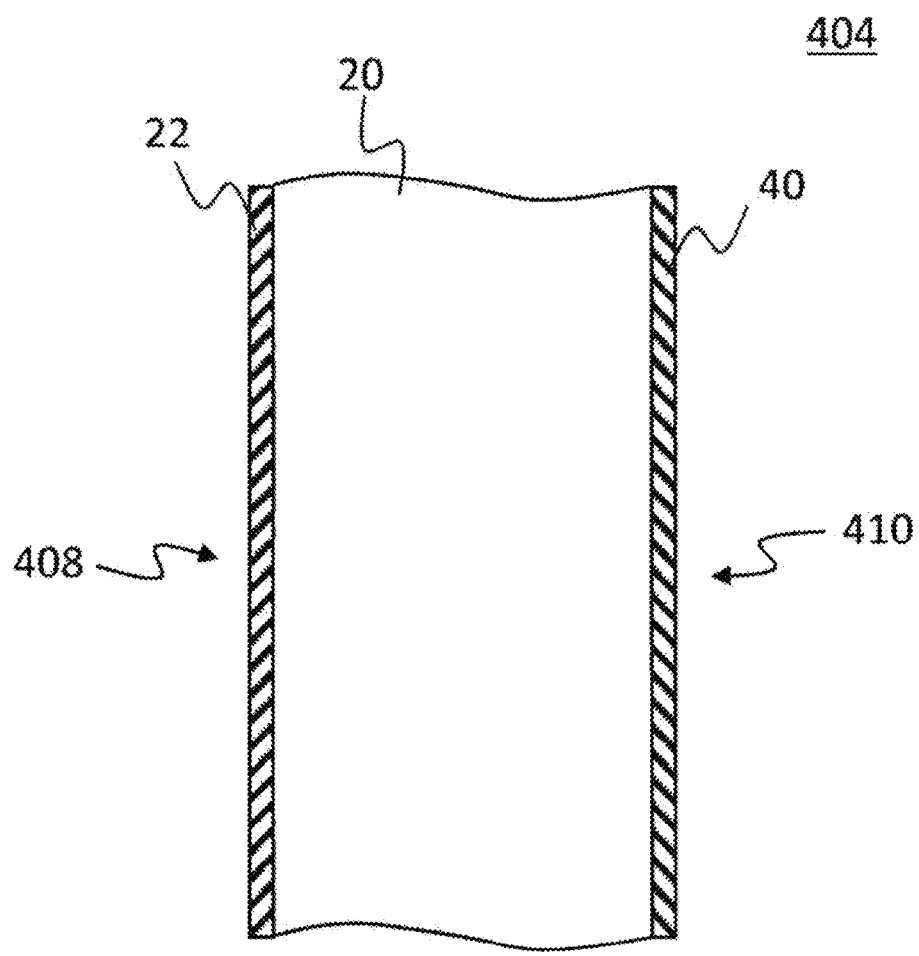
FIG. 24 is a figure showing another example of a partial cross-section of the box 400 shown in FIG. 16.

FIG. 24 is a figure showing another example of a partial cross-section of the box 400 shown in FIG. 16. In the box 400 of the present example, a front surface of the base material 20 on an outer surface 408 side of the box 400 is covered with a coating layer 22. In addition, a front surface of the base material 20 on the inner wall 410 in the internal space is covered with an inner wall coating layer 40.

As mentioned above, the coating layers 22 are a polyurea resin. In addition, the inner wall coating layer 40 is a layer of a paint containing ceramic powders, or the like. Ceramic powders are powders that exhibit an antibacterial action. Ceramic powders may be powders formed by coating a carbide such as charcoal or bamboo charcoal with a ceramic, may be powders formed by coating another material that exhibits an antibacterial action with a ceramic, or may be powders formed by causing ceramic particles to support a material that exhibits an antibacterial action such as silver ions.

Such a structure can enhance an antibacterial action of the internal space to house articles. On the outer surface 408 side, the fiber sheet 30 may be provided between a coating layer 22 and the base material 20. The fiber sheets 30 can be provided as appropriate between the coating layers 22 and the base material 20 in the respective embodiments explained with reference to FIG. 1 and FIG. 24.

In addition, on the inner wall 410 side of the box 400, between the inner wall coating layer 40 and the base material 20, a coating layer 22 may be provided, and a coating layer 22 and a fiber sheet 30 may be provided. Thereby, the strength of the base material 20 on the inner wall 410 side can also be enhanced.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

EXPLANATION OF REFERENCE SYMBOLS

10: body portion; 12: placement surface; 14: rear surface; 16: foot portion; 17, 18: positioning portion; 19: ID device; 20: base material; 21: region; 22: coating layer; 23: region; 30: fiber sheet; 40: inner wall coating layer; 100: palette; 300: manufacturing apparatus; 302: frame body; 304: support portion; 305: heating-pressing portion; 306: roller; 308: control apparatus; 310: side surface-injection apparatus; 311: injection port; 312: lower surface-injection apparatus; 314: top surface-injection apparatus; 316: auxiliary member; 318: drying portion; 320: outlet; 400: box; 402: lid portion; 404: housing portion; 406: internal space; 408: outer surface; 410: inner wall; 500: gear; 502: body; 504: shock absorbing portion; 506: fixing portion

What is claimed is:

1. A palette on which an article is placed, the palette comprising:
    a foamed synthetic resin base material; and
    a polyurea resin coating layer that covers a front surface of the base material and has a thickness controlled to satisfy $(A/20)-1 \leq T1 \leq (A/20)+1$ [mm] in which A is an expansion ratio of the foamed synthetic resin and T1 is the thickness of the coating layer.

2. The palette according to claim 1, wherein the coating layer is formed on all surfaces of the base material.

3. The palette according to claim 1, wherein a resin density at a front surface of the base material is higher than a resin density at a center of the base material.

4. The palette according to claim 1, wherein the base material has:
    a plurality of foot portions provided to a surface opposite to a placement surface on which the article is placed; and
    a positioning portion that is provided to the placement surface and defines positions of the plurality of foot portions of another palette if the other palette is placed on the placement surface.

5. The palette according to claim 4, wherein the material of the foot portions is the same as the material of the based material.

6. The palette according to claim 4, further comprising an ID device housed in a cavity of the foot portion, wherein
    the ID device stores identification information identifying the palette.

7. The palette according to claim 1, further comprising a fiber sheet provided between the base material and the coating layer, wherein
    the fiber sheet is a carbon fiber-containing sheet or a basalt fiber sheet.

8. The palette according to claim 7, wherein
    the base material has a plurality of foot portions provided to a surface opposite to a placement surface on which the article is placed, and
    the fiber sheet is provided to a region that is on the placement surface and is other than a region facing the plurality of foot portions.

9. The palette according to claim 1, wherein the polyurea resin includes a polyisocyanate compound and a synthetic resin that are mixed therein.

10. A box having an internal space, the box comprising:
    a foamed synthetic resin base material to which the internal space is provided; and
    a polyurea resin coating layer covering a front surface of the base material and an inner wall of the internal space, and has a thickness controlled to satisfy $(A/20)-1 \leq T1 \leq (A/20)+1$ |[mm] in which A is an expansion ratio of the foamed synthetic resin and T1 is the thickness of the coating layer.

11. A resin shaped body-manufacturing method comprising:
    injecting a polyurea resin coating material onto a front surface of a foamed synthetic resin base material by controlling a thickness of the coating material formed on the front surface of the base material so that an expansion ratio A of the foamed synthetic resin and the thickness T1 of the coating layer satisfies:

$$(A/20)-1 \leq T1 \leq (A/20)+1 \text{ [mm]; and}$$

drying the coating material after the injecting.

12. The resin shaped body-manufacturing method according to claim 11, wherein the injecting has injecting the coating material onto all surfaces of the base material.

13. The resin shaped body-manufacturing method according to claim 11, wherein the thickness of the coating material is controlled by adjusting at least one of: a speed of conveyance of the base material; and a distance between an injection port for the coating material and the base material.

14. The resin shaped body-manufacturing method according to claim 11, further comprising heating the base material before the injecting.

15. The resin shaped body-manufacturing method according to claim 11, further comprising pressing the base material before the injecting.

16. The resin shaped body-manufacturing method according to claim 15, wherein the pressing, the injecting and the drying are performed while the base material is being conveyed by a plurality of rollers.

17. The resin shaped body-manufacturing method according to claim 11, further comprising, before the injecting, setting a parameter for injection of a coating material, the parameter including a coating material injection amount per unit time.

18. The resin shaped body-manufacturing method according to claim 11, further comprising, before the injecting, pressing the base material so that a resin density at a front surface of the base material becomes higher than a resin density at a center of the base material.

19. The palette according to claim 1, wherein
the base material was pressed so that a resin density at a front surface of the base material becomes higher than a resin density at a center of the base material; and
the polyurea resin coating layer covers the pressed front surface of the base material.

20. The palette according to claim 1, wherein the base material is a single continuous body that extends throughout the pallet.

* * * * *